US010824368B2

(12) United States Patent
Yeh

(10) Patent No.: US 10,824,368 B2
(45) Date of Patent: Nov. 3, 2020

(54) DATA STORING METHOD, MEMORY CONTROL CIRCUIT UNIT AND MEMORY STORAGE DEVICE

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 130 days.

(21) Appl. No.: 15/729,666

(22) Filed: Oct. 10, 2017

(65) Prior Publication Data
US 2019/0065101 A1    Feb. 28, 2019

(30) Foreign Application Priority Data
Aug. 29, 2017   (TW) .............................. 106129385 A

(51) Int. Cl.
*G06F 3/06* (2006.01)
*G06F 13/16* (2006.01)

(52) U.S. Cl.
CPC .......... *G06F 3/0656* (2013.01); *G06F 3/0604* (2013.01); *G06F 3/0652* (2013.01); *G06F 3/0683* (2013.01); *G06F 13/1673* (2013.01)

(58) Field of Classification Search
CPC .... G06F 3/0656; G06F 3/0604; G06F 3/0652; G06F 3/0683; G06F 13/1673
USPC ....................................................... 711/166
See application file for complete search history.

(56) References Cited

U.S. PATENT DOCUMENTS

| | | | | |
|---|---|---|---|---|
| 7,917,685 B2* | 3/2011 | Ha | ....................... | G11C 11/5642 711/100 |
| 2006/0069859 A1* | 3/2006 | Hayasaka | ........ | G11B 20/10527 711/112 |
| 2010/0318839 A1* | 12/2010 | Avila | .................. | G06F 12/0802 714/5.11 |
| 2014/0372678 A1* | 12/2014 | Moon | ................. | G06F 12/0246 711/103 |
| 2015/0339187 A1* | 11/2015 | Sharon | ................... | G11C 29/52 714/766 |

FOREIGN PATENT DOCUMENTS

| | | |
|---|---|---|
| TW | 201428491 | 7/2014 |
| TW | 201719413 | 6/2017 |

OTHER PUBLICATIONS

"Office Action of Taiwan Counterpart Application," dated Aug. 14, 2018, pp. 1-5.

* cited by examiner

*Primary Examiner* — Hua J Song
(74) *Attorney, Agent, or Firm* — JCIPRNET

(57) ABSTRACT

A data storing method, a memory control circuit unit and a memory storage device are provided. The method includes: receiving a first write command from a host system; determining whether to write a first data corresponding to the first write command by using a first mode or write the first data by using a second mode according to an available buffer memory state; writing the first data into a first physical erasing unit among a plurality of physical erasing units by using the first mode when the first data is determined to be written by using the first mode; and writing the first data into a second physical erasing unit among the physical erasing units by using the second mode when the first data is determined to be written by using the second mode.

27 Claims, 13 Drawing Sheets

DATA STORING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 106129385, filed on Aug. 29, 2017. The entirety of the above-mentioned patent application is hereby incorporated by reference herein and made a part of this specification.

BACKGROUND OF THE INVENTION

1. Field of the Invention

The invention relates to a data storing method, a memory control circuit unit and a memory storage device.

2. Description of Related Art

The growth of digital cameras, mobile phones, and MP3 players has been rapid in recent years. Consequently, the consumers' demand for storage media has increased tremendously. In recent years, a rewritable non-volatile memory has become an import part of the electronic industries because the rewritable non-volatile memory is capable of providing features such as data non-volatility, low power consumption, small volume, non-mechanical structure and high read/write speed. For instance, a solid-state drive utilizing a flash memory as a storage media has been widely applied in a computer host as a main hard disk for enhancing access efficiency of computer.

SUMMARY OF THE INVENTION

The invention proposes a data storing method, a memory control circuit unit and a memory storage device, which are capable of dynamically determining how the data is written according to an available buffer memory state. As a result, flexibility in use of the memory storage device may be improved.

The invention provides a data storing method for a memory storage device having a rewritable non-volatile memory module. The rewritable non-volatile memory module includes a plurality of physical erasing units, and each physical erasing unit among the physical erasing units has a plurality of physical programming units. The data storing method includes: receiving a first write command from a host system; determining whether to write a first data corresponding to the first write command by using a first mode or write the first data by using a second mode according to an available buffer memory state; writing the first data into a first physical erasing unit among the physical erasing units by using the first mode when the first data is determined to be written by using the first mode according to the available buffer memory state; and writing the first data into a second physical erasing unit among the physical erasing units by using the second mode when the first data is determined to be written by using the second mode according to the available buffer memory state.

The invention provides a memory control circuit unit configured to control a rewritable non-volatile memory module. The rewritable non-volatile memory module includes a plurality of physical erasing units, and each physical erasing unit among the physical erasing units has a plurality of physical programming units. The memory control circuit unit includes a host interface, a memory interface and a memory management circuit. The host interface is coupled to a host system. The memory interface is coupled to the rewritable non-volatile memory module. The memory management circuit is coupled to the host interface and the memory interface. The memory management circuit is configured perform the following operations: receiving a first write command from a host system; determining whether to write a first data corresponding to the first write command by using a first mode or write the first data by using a second mode according to an available buffer memory state; writing the first data into a first physical erasing unit among the physical erasing units by using the first mode when the first data is determined to be written by using the first mode according to the available buffer memory state; and writing the first data into a second physical erasing unit among the physical erasing units by using the second mode when the first data is determined to be written by using the second mode according to the available buffer memory state.

The invention provides a memory storage device. The memory storage device includes a connection interface unit, a rewritable non-volatile memory module and a memory control circuit unit. The connection interface unit is configured to couple to a host system. The rewritable non-volatile memory module includes a plurality of physical erasing units, and each physical erasing unit among the physical erasing units has a plurality of physical programming units. The memory control circuit unit is coupled to the connection interface unit and the rewritable non-volatile memory module. The memory control circuit unit is configured to perform the following operations: receiving a first write command from a host system; determining whether to write a first data corresponding to the first write command by using a first mode or write the first data by using a second mode according to an available buffer memory state; writing the first data into a first physical erasing unit among the physical erasing units by using the first mode when the first data is determined to be written by using the first mode according to the available buffer memory state; and writing the first data into a second physical erasing unit among the physical erasing units by using the second mode when the first data is determined to be written by using the second mode according to the available buffer memory state.

Based on the above, a data storing method, a memory control circuit unit and a memory storage device proposed by the invention are capable of dynamically determining how the data is written according to the available buffer memory state. As a result, flexibility in use of the memory storage device may be improved.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
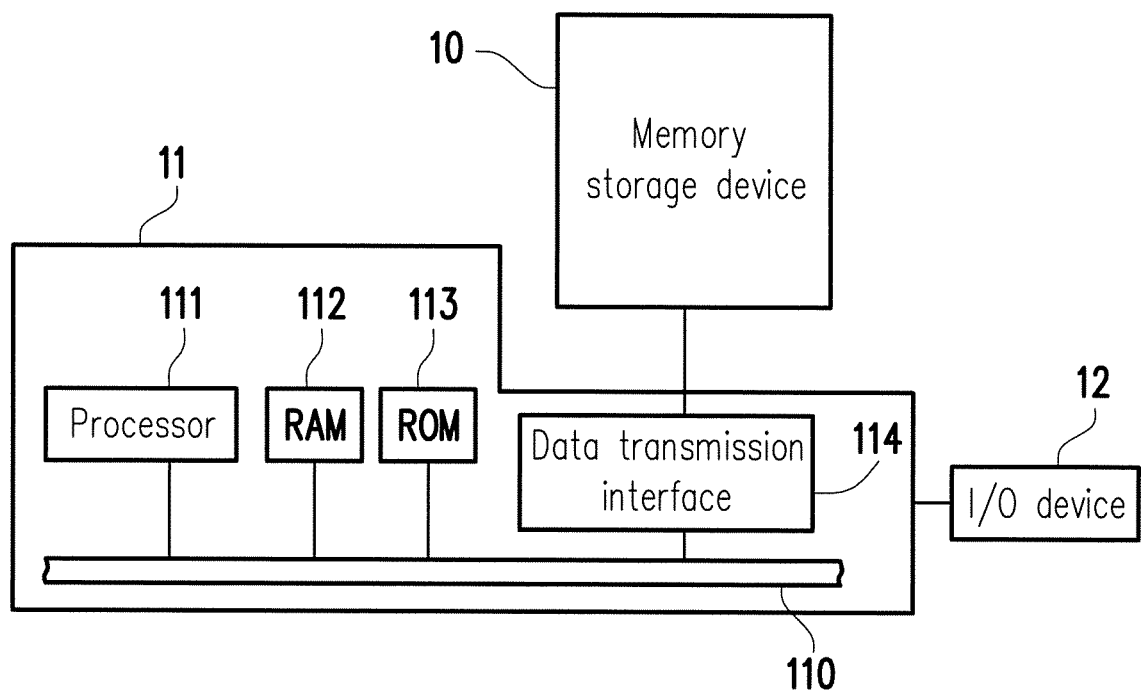
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
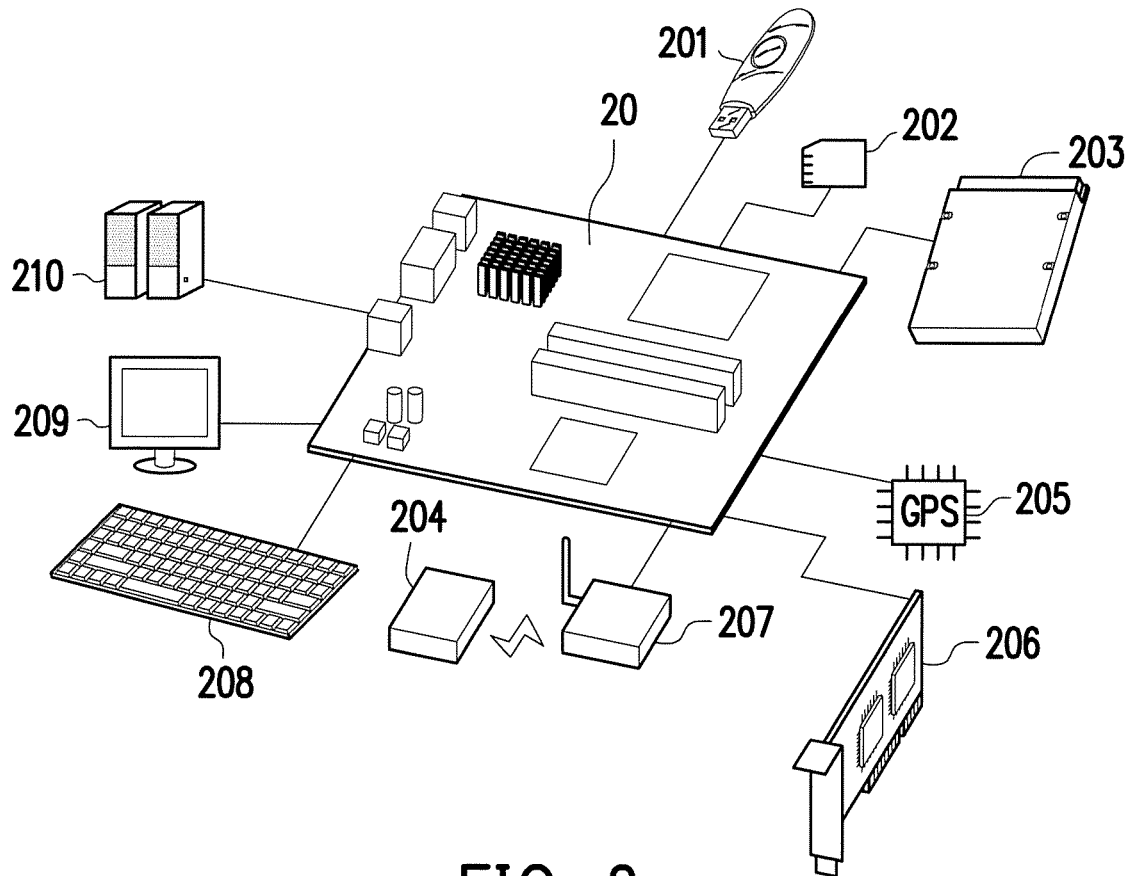
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
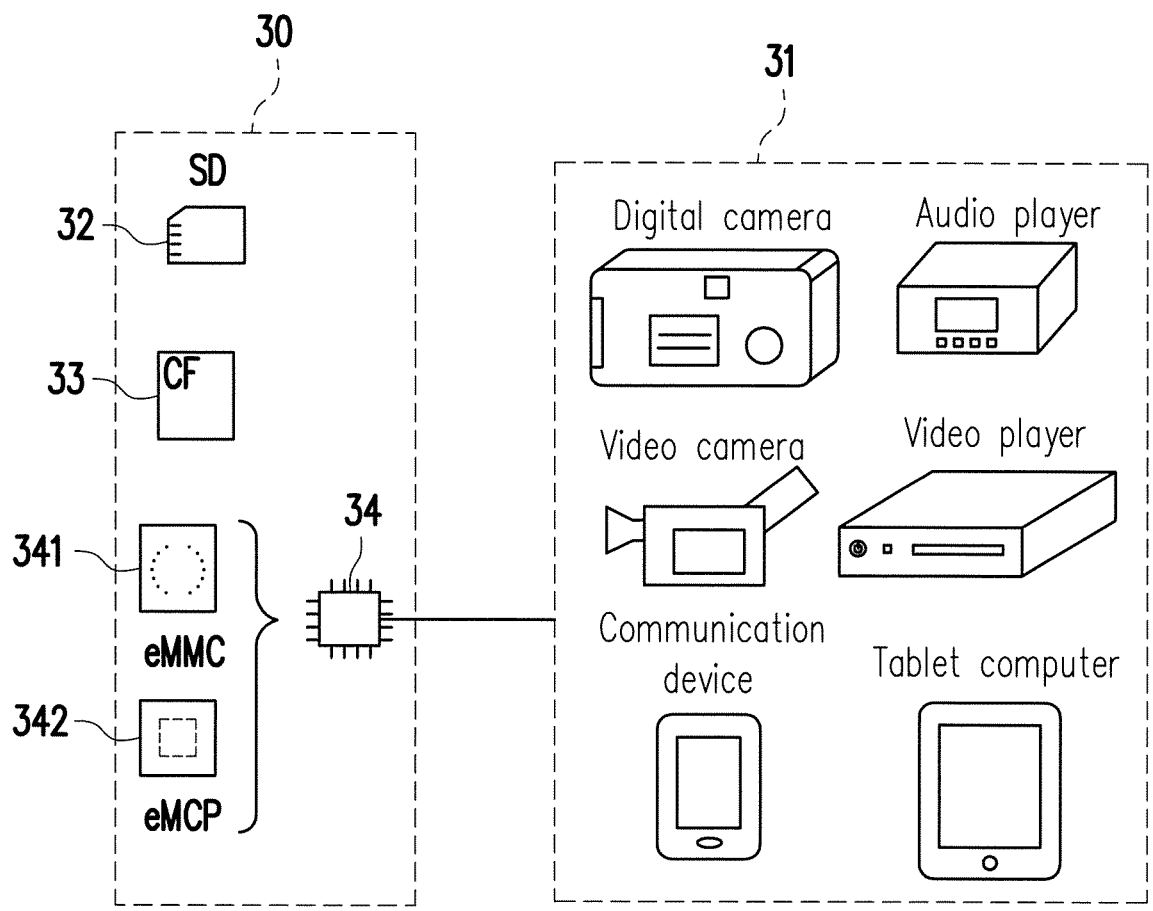
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in the foregoing exemplary embodiments, nonetheless, FIG. 3 is a schematic diagram illustrating a host system and a memory storage device according to another exemplary embodiment of the invention. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
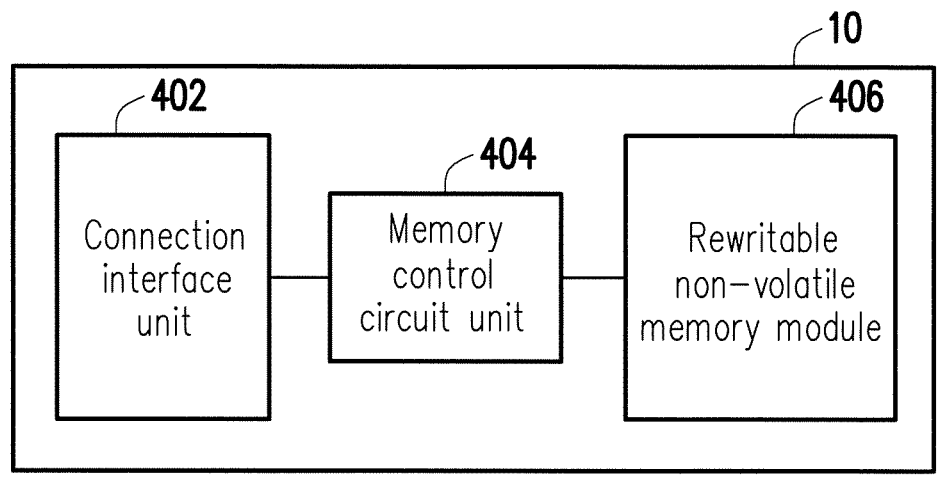
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. In the present exemplary embodiment, the connection interface unit 402 is compatible with a PCI Express (Peripheral Component Interconnect Express) interface standard, and is also compatible with an NVM express interface standard. Specifically, the NVM express interface standard refers to a protocol for communication between the host system and the memory storage device, which defines register interface, command set and feature set between a controller of the memory storage device and an operating system of the host system and aims to improve a data access speed and a data transmission rate for the PCIe interface-based memory storage device by optimizing the interface standard of the memory storage device. However, in another exemplary embodiment, the connection interface unit 402 may also be compatible with other suitable standards. In addition, the connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". Each of the memory cells in the rewritable non-volatile memory module 406 has a plurality of storage states depended on changes in the threshold voltage. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. When the physical programming units are the physical page, these physical programming units usually include a data bit area and a redundancy bit area. The data bit area includes multiple physical sectors configured to store user data, and the redundant bit area is configured to store system data (e.g., management data such as an error correcting code, etc.). In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
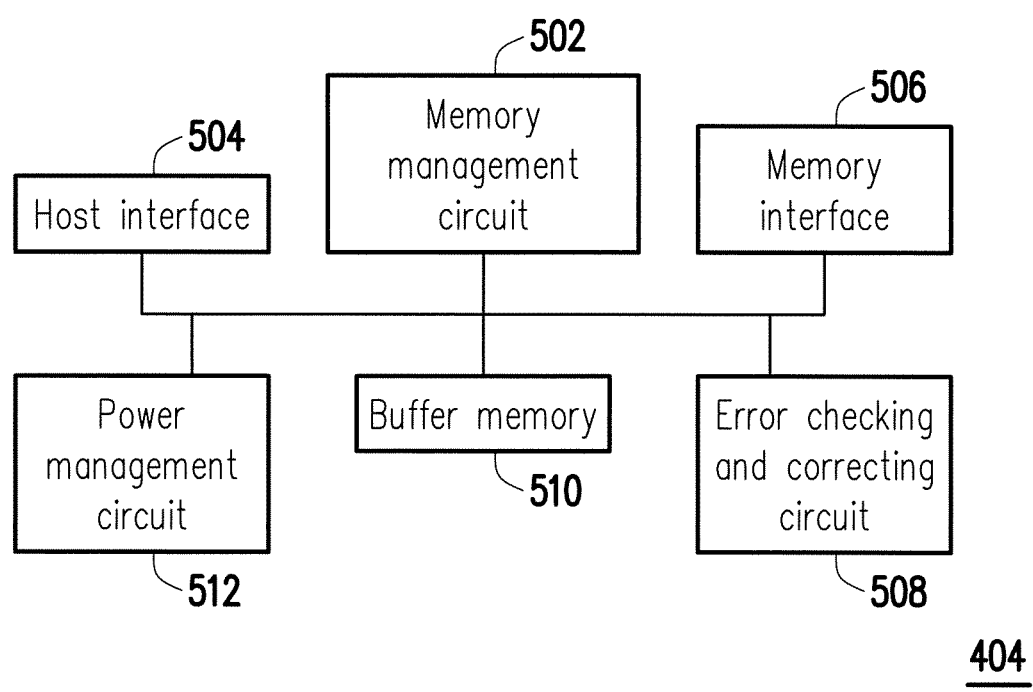
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands and the control commands are executed to perform various operations such as writing, reading and erasing data during operation of the memory storage device 10. Hereinafter, operation of the memory management circuit 502 is described as equivalent to describe operation of the memory control circuit unit 404.

In the present exemplary embodiment, the control commands of the memory management circuit 502 are implemented in a firmware form. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. Nevertheless, it should be understood that the invention is not limited to the above. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection operation). These command sequences are generated by the memory management circuit 502 and transmitted to the rewritable non-volatile memory module 406 through the memory interface 506, for example. The command sequences may include one or more signals, or data on the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

Figure 6:
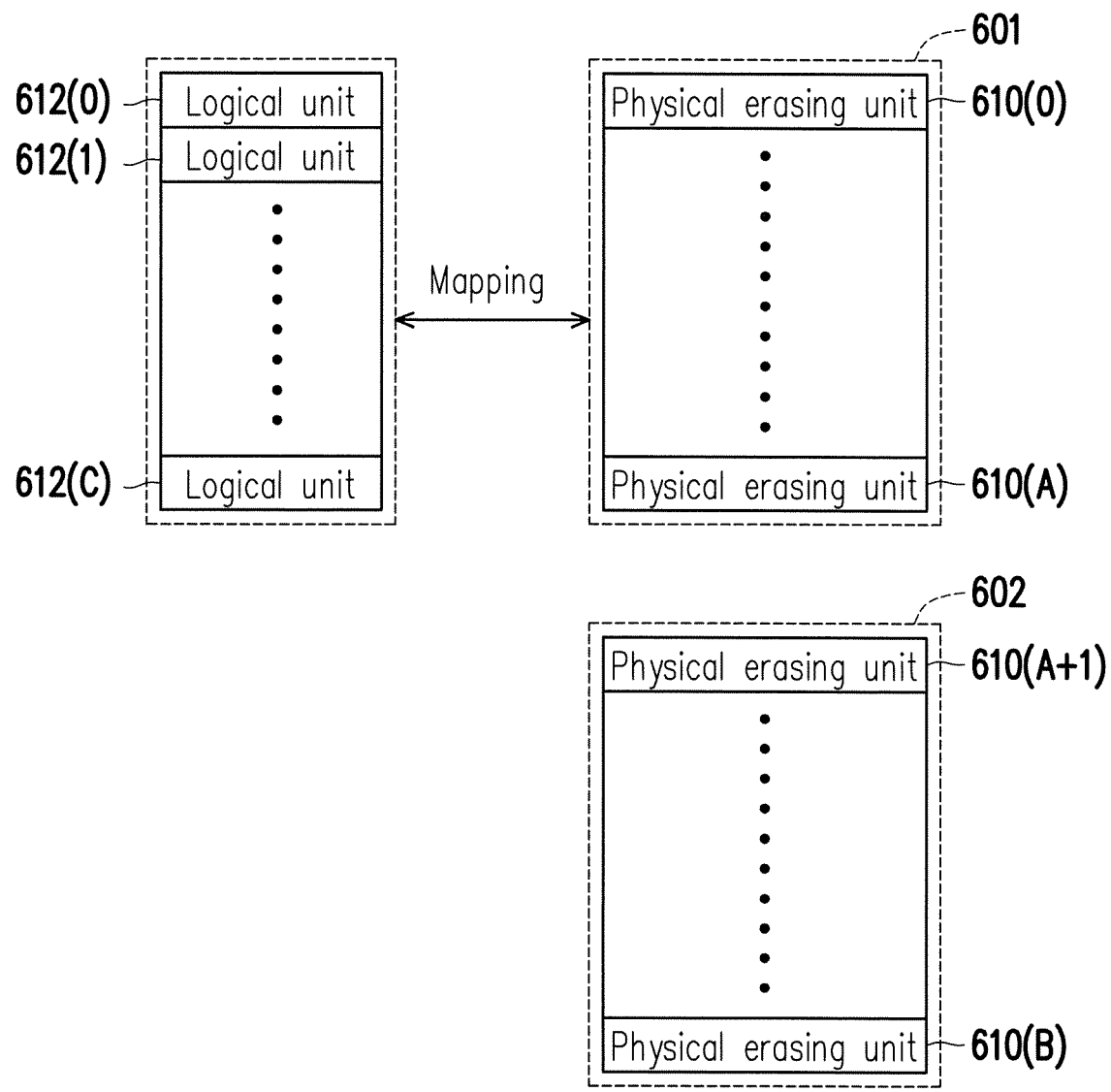
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention. It should be noted that terms used for describing management of the rewritable non-volatile memory module 406, such as "select" and "group" and so forth, are logical operational concepts. That is to say, only a part of physical elements of the rewritable non-volatile memory module 406 is logically operated while the actual location of each physical element of the rewritable non-volatile memory module 406 remains unchanged.

Referring to FIG. 6, the memory management circuit 502 logically groups physical erasing units 610(0) to 610(B) of the rewritable non-volatile memory module 406 into a storage area 601 and a replacement area 602. The physical erasing units 610(0) to 610(A) in the storage area 601 are configured to store data, whereas the physical erasing units 610(A+1) to 610(B) in the replacement area 602 are configured to replace damaged physical erasing units in the storage area 601. For example, if data read from one specific physical erasing unit includes too many errors and thus cannot be corrected, the specific physical erasing unit will be considered as a damaged physical erasing unit. It should be noted that, if there are no available physical erasing units in the storage area 602, the memory management circuit 502 may declare the memory storage device 10 as in a write protect state so data can no longer be written thereto.

It should be noted that, in another exemplary embodiment, one physical unit may also refer to one physical address, one physical programming unit, or a composition of a plurality of continuous or discontinuous physical addresses. The memory management circuit 502 assigns logical units 612 (0) to 612(C) for mapping to the physical erasing units 610(0) to 610(A) in the storage area 601. In the present exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical erasing units.

The memory management circuit 502 records a mapping relation (a.k.a. a logical-physical address mapping relation) between the logical units and the physical erasing units into at least one logical-physical address mapping table. When the host system 11 intends to read the data from the memory storage device 10 or write the data into the memory storage device 10, the memory management circuit 502 can perform an accessing operation on the memory storage device 10 according to the logical-to-physical address mapping table.

In the present exemplary embodiment, when the memory management circuit 502 receives a first write command from the host system 11, the memory management circuit 502 determines whether to write a first data of the first write command into the rewritable non-volatile memory 406 by using a first mode or write the first data into the rewritable non-volatile memory 406 by using a second mode according to an available buffer memory state. For example, the memory management circuit 502 determines whether a memory space (herein, also known as a first buffer memory) is divided for the memory management circuit 502 to use in the RAM 112 of the host system 11 or whether a space size of the first buffer memory is greater than a threshold.

When the RAM 112 of the host system 11 is configured with the first buffer memory for the memory management circuit 502 to use or the space of the first buffer is sufficient, the memory management circuit 502 writes the first data into a physical erasing unit (hereinafter, also known as a first physical erasing unit) among the physical erasing units of the rewritable non-volatile memory module 406 by using the first mode.

When the RAM 112 of the host system 11 is not configured with the first buffer memory for the memory management circuit 502 to use or the space of the first buffer is insufficient, the memory management circuit 502 writes the first data into a physical erasing unit (hereinafter, also known as a second physical erasing unit) among the physical erasing units of the rewritable non-volatile memory module 406 by using the second mode.

Figure 7:
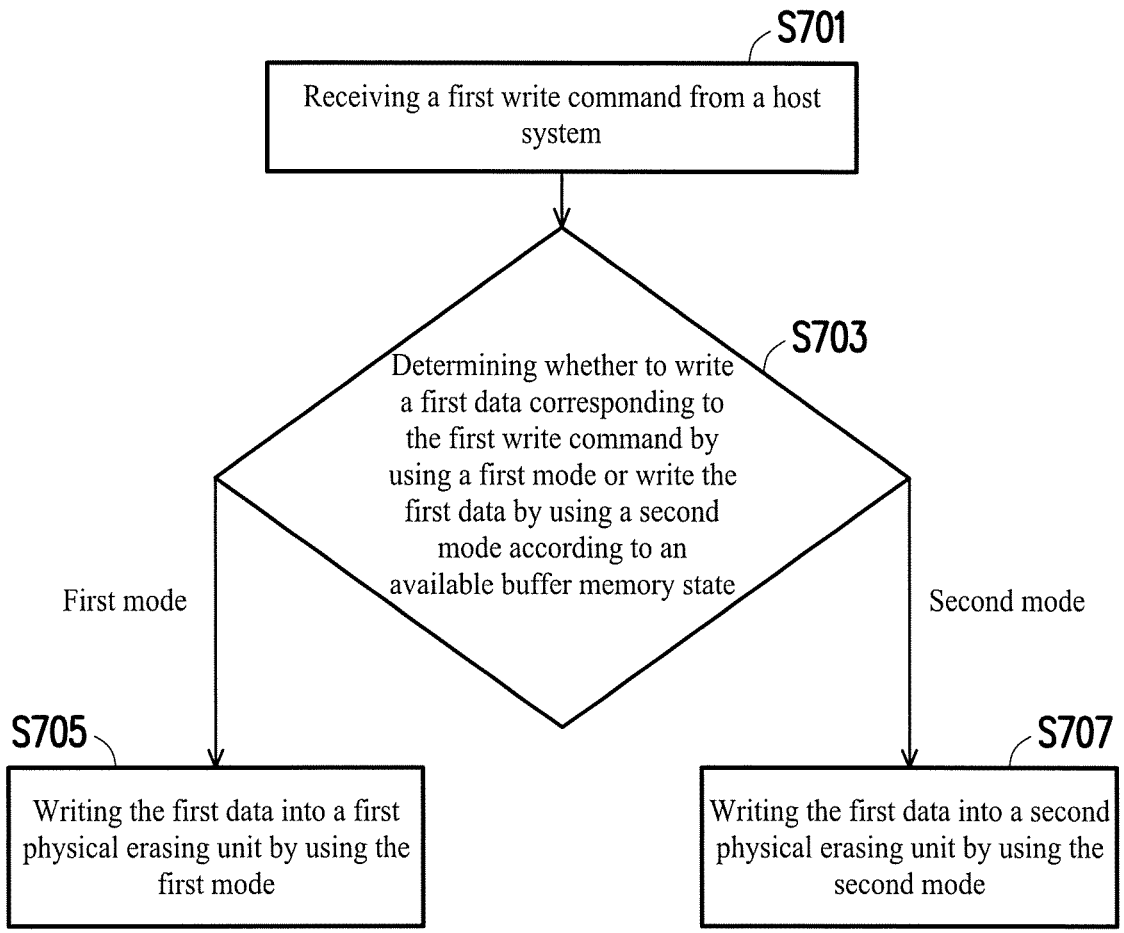
FIG. 7 is a flowchart illustrating a data storing method according to an exemplary embodiment of the invention.

FIG. 7 is a flowchart illustrating a data storing method according to an exemplary embodiment of the invention.

In step S701, the memory management circuit 502 receives a first write command from the host system 11. In step S703, the memory management circuit 502 determines whether to write a first data corresponding to the first write command by using a first mode or write the first data by using a second mode according to an available buffer memory state. In the present exemplary embodiment, the buffer memory state is, for example, a size of an additional volume that can be used to support operations of the buffer memory 510 in the host system 11, a configuration condition of the buffer memory 510 or a state regarding whether the buffer memory of the host system 11 can be used by the memory management circuit 502.

When the first data is determined to be written by using the first mode according to the available buffer memory state, in step S705, the memory management circuit 502 writes the first data into a first physical erasing unit by using the first mode.

When the first data is determined to be written by using the second mode according to the available buffer memory state, in step S707, the memory management circuit 502 writes the first data into a second physical erasing unit by using the second mode.

Processes of using the first mode and the second mode are described with reference to detailed embodiments as follows.

First Exemplary Embodiment

Traditionally, a flash memory controller of a flash memory storage device is configured with a buffer memory. When receiving a write command and a plurality of data from a host system, the flash memory controller first temporarily stores the data into the buffer memory and calculates for a corresponding parity information according to the data. After that, the flash memory controller writes said data and the parity information from the buffer memory into a physical erasing unit of the flash memory. In particular, as limited by available resources of the buffer memory, it is unable to generate a large amount of parity information at the same since resources available for calculating the parity information in the buffer memory is relatively less. Therefore, the physical erasing unit normally includes only a small amount of parity information for error detection. For example, one physical erasing unit may include only one parity information capable of correcting errors for the physical programming units in the physical erasing unit.

It should be noted that, it is possible to increase the available resources by dividing a part of space (herein, also known as a host buffer memory space) from a RAM of the host system for the flash memory storage device to use. Nonetheless, because the host buffer memory space may be retrieved or removed by the host system, errors are likely to occur on calculation or storage of the parity information when the host buffer memory space is removed. The reason is that, when the host buffer memory space is being removed, the flash memory space is lack of sufficient resources (e.g., the space of the buffer memory) for generating the parity information with the equivalent amount of the host buffer memory space before removal.

To avoid the above situation, the traditional method still focuses on generating the corresponding amount of the parity information according to the available resources of the buffer memory in the flash memory controller. However, since the amount of the parity information generated by aforesaid method is less, a degree of protection for the data stored in the physical erasing unit is also relatively low. The first exemplary embodiment of the invention is mainly used to solve the above-mentioned problem.

Figure 8A:
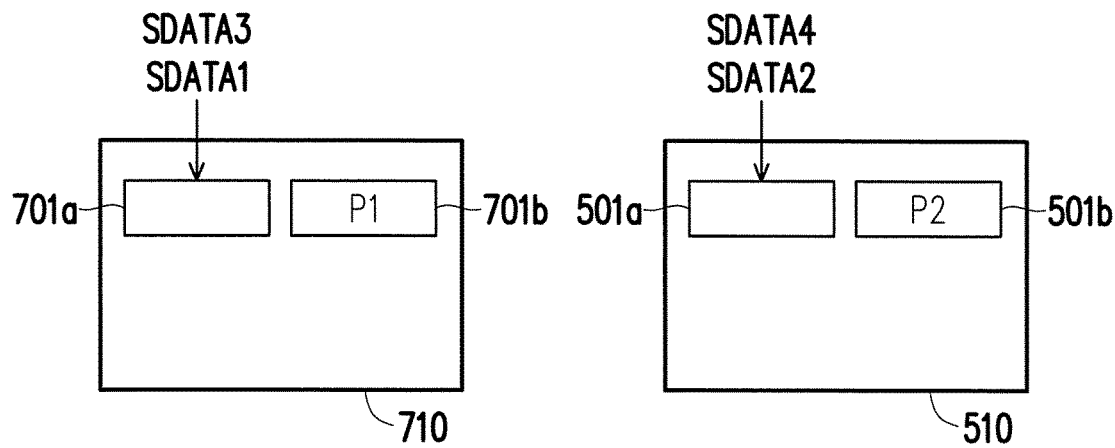
FIG. 8A and FIG. 8B are schematic diagrams illustrating a writing operation using the first mode according the first exemplary embodiment of the invention.
Figure 8B:
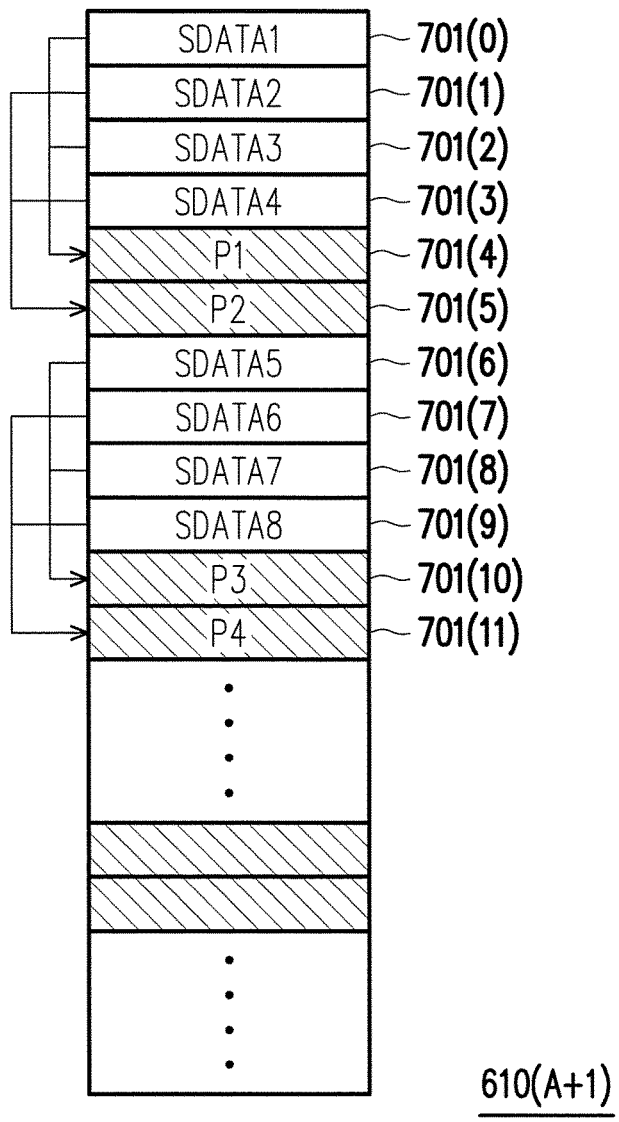

FIG. 8A and FIG. 8B are schematic diagrams illustrating a writing operation using the first mode according the first exemplary embodiment of the invention.

Referring to FIG. 8A and FIG. 8B together, it is assumed that the host system 11 gives a write command (hereinafter, also known as a first write command), and a first data corresponding to said write command may be divided into a sub-data SDATA1, a sub-data SDATA2, a sub-data SDATA3 and a sub-data SDATA4. In this case, the memory management circuit 502 determines whether to write the first data into the rewritable non-volatile memory 406 by using a first mode or write the first data into the rewritable non-volatile memory 406 by using a second mode according to an available buffer memory state. Herein, the sub-data SDATA1 and the sub-data SDATA2 are collectively referred to as "a first sub-data", and the sub-data SDATA3 and the sub-data SDATA4 are collectively referred as "a second sub-data".

In the embodiment of FIG. 8A and FIG. 8B, it is assumed that a first buffer memory 710 is divided for the memory management circuit 502 to use in the RAM 112 of the host system 11. In this case, the memory management circuit 502 can write the first data by using the first mode. Specifically, the memory management circuit 502 can, for example, temporarily store the sub-data SDATA1 into a temporary area 701a in the first buffer memory 710, and record parity information P1 (a.k.a. a third parity information) in a temporary area 701b in the first buffer memory 710. It is assumed herein that no other parity information is temporarily stored in the temporary area 701b, and thus a value of the parity information P1 is identical to a value of the sub-data SDATA1 at the time. Afterwards, the memory management circuit 502 selects one physical erasing unit (e.g., a physical erasing unit 610(A+1)), and writes the sub-data SDATA1 from the first buffer memory 710 into a physical programming unit 701(0) of the physical erasing unit 610(A+1) (a.k.a. a first physical erasing unit).

Similarly, the memory management circuit 502 can, for example, temporarily store the sub-data SDATA2 into a temporary area 501a in the buffer memory 510 (a.k.a. a second buffer memory) of the memory control circuit unit 404, and record parity information P2 (a.k.a. a fourth parity information) in a temporary area 501b in the buffer memory 510. It is assumed herein that no other parity information is temporarily stored in the temporary area 501b, and thus a value of the parity information P2 is identical to a value of the sub-data SDATA2 at the time. Afterwards, the memory management circuit 502 writes the sub-data SDATA2 from the buffer memory 510 into a physical programming unit 701(1) of the physical erasing unit 610(A+1).

Similarly, the memory management circuit 502 can, for example, temporarily store the sub-data SDATA3 into the temporary area 701a in the first buffer memory 710, and update the parity information P1 recorded in the temporary area 701b. For example, the memory management circuit 502 performs an XOR operation on a value of the sub-data SDATA3 and the value of the parity information P1 temporarily stored in the temporary area 701b in order to generate a new parity information P1, and temporarily stores the new parity information P1 into the temporary area 701b. Afterwards, the memory management circuit 502 writes the sub-data SDATA3 from the first buffer memory 710 into a physical programming unit 701(2) of the physical erasing unit 610(A+1).

Similarly, the memory management circuit 502 can, for example, temporarily store the sub-data SDATA4 into the temporary area 501a in the buffer memory 510, and update the parity information P2 recorded in the temporary area 501b. For example, the memory management circuit 502 performs an XOR operation on a value of the sub-data SDATA4 and the value of the parity information P2 temporarily stored in the temporary area 501b in order to generate a new parity information P2, and temporarily stores the new parity information P2 into the temporary area 501b. Afterwards, the memory management circuit 502 writes the sub-data SDATA4 from the buffer memory 510 into a physical programming unit 701(3) of the physical erasing unit 610(A+1).

Then, the memory management circuit 502 can write the parity information P1 in the first buffer memory 710 into a physical programming unit 701(4) of the physical erasing unit 610(A+1). Also, the memory management circuit 502 can write the parity information P2 in the buffer memory 510 into a physical programming unit 701(5) of the physical erasing unit 610(A+1). It should be noted that, the parity information P1 and P2 may be collectively referred to as "a first parity information", and the first parity information is used for correcting the first data written by using the first mode. However, in another embodiment, the first parity information may also be used for correcting other corresponding data.

In addition, the physical programming units 701(0) and 701(2) may be collectively referred to as "a first physical programming unit"; the physical programming units 701(4) may be referred to as "a second physical programming unit"; the physical programming units 701(1) and 701(3) may be collectively referred to as "a third physical programming unit"; the physical programming units 701(5) may be referred to as "a fourth physical programming unit".

Moreover, the memory management circuit 502 can also mark the physical erasing unit 610(A+1) by using a first flag so as to indicate that the physical erasing unit 610(A+1) is written (or programmed) by using the first mode. Later, when the memory management circuit 502 needs to write the physical erasing unit 610(A+1) again, the memory management circuit 502 may know that the physical erasing unit 610(A+1) may only be written by using the first mode according to the first flag. For example, later if the memory management circuit 502 receives another write command and a sub-data SDATA5, a sub-data SDATA6, a sub-data SDATA7 and a sub-data SDATA8 corresponding to said another write command from the host system, the memory management circuit 502 can write the sub-data SDATA5, the sub-data SDATA6, the sub-data SDATA7 and the sub-data SDATA8 into physical programming units 701(6) to 701(9) of the physical erasing unit 610(A+1), respectively, by using the first mode with the same method of writing the sub-data SDATA1, the sub-data SDATA2, the sub-data SDATA3 and the sub-data SDATA4 as described above. The memory management circuit 502 also generates parity information P3 according to the sub-data SDATA5 and the sub-data SDATA7 and writes the parity information P3 into a physical programming unit 701(10) of the physical erasing unit 610(A+1). The memory management circuit 502 further generates parity information P4 according to the sub-data SDATA6 and the sub-data SDATA8 and writes the parity information P4 into a physical programming unit 701(11) of the physical erasing unit 610(A+1).

Figure 9A:
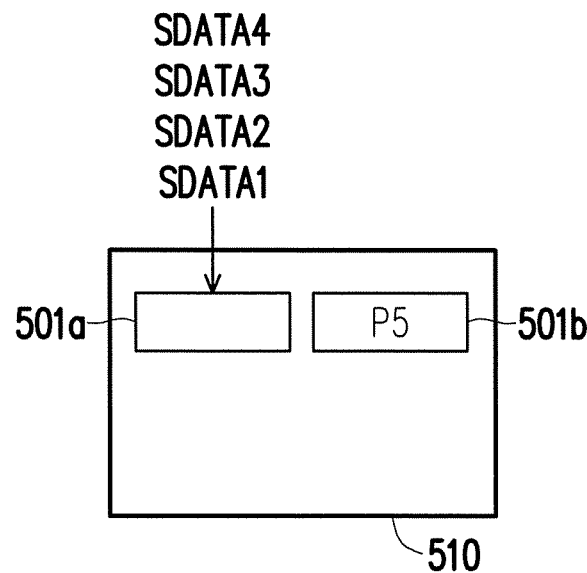
FIG. 9A and FIG. 9B are schematic diagrams illustrating a writing operation using the second mode according the first exemplary embodiment of the invention.
Figure 9B:
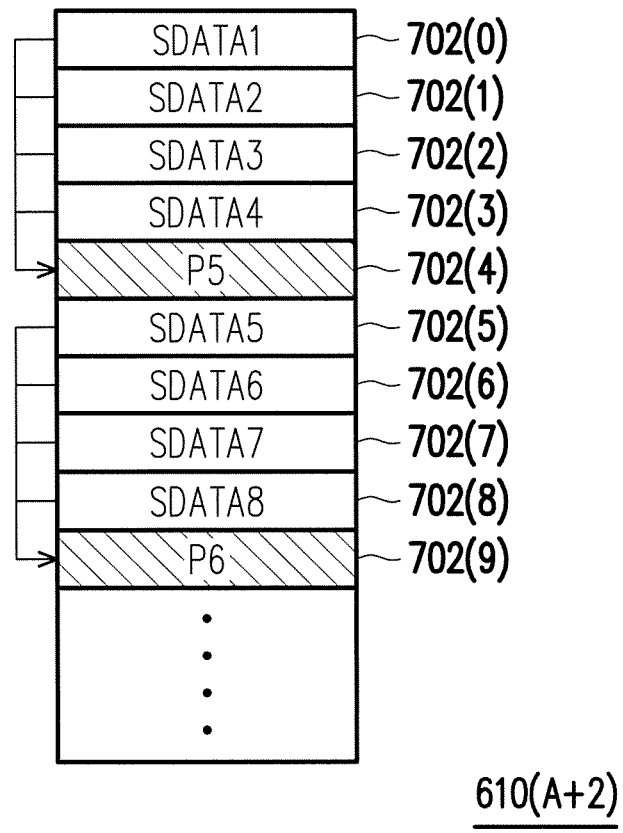

FIG. 9A and FIG. 9B are schematic diagrams illustrating a writing operation using the second mode according to the first exemplary embodiment of the invention.

Referring to FIG. 9A and FIG. 9B together, as similar to FIG. 8A and FIG. 8B, it is assumed that the host system 11 gives a write command (hereinafter, also known as a first write command), and a first data corresponding to the first write command may be divided into a sub-data SDATA1, a sub-data SDATA2, a sub-data SDATA3 and a sub-data SDATA4. In this case, the memory management circuit 502 determines whether to write the first data into the rewritable non-volatile memory 406 by using a first mode or write the first data into the rewritable non-volatile memory 406 by using a second mode according to an available buffer memory state.

The difference is that, in the embodiment of FIG. 9A and FIG. 9B, it is assumed that the first buffer memory 710 is not divided for the memory management circuit 502 to use in the RAM 112 of the host system 11. In this case, the memory management circuit 502 writes the first data by using the second mode. Specifically, the memory management circuit 502 can, for example, temporarily store the sub-data SDATA1 into the temporary area 501a in the buffer memory 510, and record parity information P5 (a.k.a. a second parity information) in the temporary area 501*b* in the buffer memory 510. The second parity information is used for correcting the first data written by using the second mode. However, in another embodiment, the second parity information may also be used for correcting other corresponding data.

It is assumed herein that no other parity information is temporarily stored in the temporary area 501*b*, and thus a value of the parity information P5 is identical to a value of the sub-data SDATA1 at the time. Afterwards, the memory management circuit 502 selects one physical erasing unit (e.g., a physical erasing unit 610(A+2)), and writes the sub-data SDATA1 from the buffer memory 510 into a physical programming unit 702(0) of the physical erasing unit 610(A+2) (a.k.a. a second physical erasing unit).

Similarly, the memory management circuit 502 can, for example, temporarily store the sub-data SDATA2 into the temporary area 501*a* in the buffer memory 510, and update the parity information P5 recorded in the temporary area 501*b*. For example, the memory management circuit 502 performs an XOR operation on a value of the sub-data SDATA2 and the value of the parity information P5 temporarily stored in the temporary area 501*b* in order to generate a new parity information P5, and temporarily stores the new parity information P5 into the temporary area 501*b*. Afterwards, the memory management circuit 502 writes the sub-data SDATA2 from the buffer memory 510 into a physical programming unit 702(1) of the physical erasing unit 610(A+2).

Similarly, the memory management circuit 502 can, for example, temporarily store the sub-data SDATA3 into the temporary area 501*a* in the buffer memory 510, and update the parity information P5 recorded in the temporary area 501*b*. For example, the memory management circuit 502 performs an XOR operation on a value of the sub-data SDATA3 and the value of the parity information P5 temporarily stored in the temporary area 501*b* in order to generate a new parity information P5, and temporarily stores the new parity information P5 into the temporary area 501*b*. Afterwards, the memory management circuit 502 writes the sub-data SDATA3 from the buffer memory 510 into a physical programming unit 702(2) of the physical erasing unit 610(A+2).

Similarly, the memory management circuit 502 can, for example, temporarily store the sub-data SDATA4 into the temporary area 501*a* in the buffer memory 510, and update the parity information P5 recorded in the temporary area 501*b*. For example, the memory management circuit 502 performs an XOR operation on a value of the sub-data SDATA4 and the value of the parity information P5 temporarily stored in the temporary area 501*b* in order to generate a new parity information P5, and temporarily stores the new parity information P5 into the temporary area 501*b*. Afterwards, the memory management circuit 502 writes the sub-data SDATA4 from the buffer memory 510 into a physical programming unit 702(3) of the physical erasing unit 610(A+2).

Then, the memory management circuit 502 can write the parity information P5 in the buffer memory 510 into a physical programming unit 702(4) of the physical erasing unit 610(A+2). It should be noted that, the physical programming units 702(0) to 702(3) may be collectively referred to as "a fifth physical programming unit"; the physical programming units 702(4) may be referred to as "a sixth physical programming unit".

Moreover, the memory management circuit 502 also marks the physical erasing unit 610(A+2) by using a second flag so as to indicate that the physical erasing unit 610(A+2) is written by using the second mode. Later, when the memory management circuit 502 needs to write the physical erasing unit 610(A+2) again, the memory management circuit 502 can know that the physical erasing unit 610(A+2) may only be written by using the second mode according to the second flag. For example, later if the memory management circuit 502 receives another write command and a sub-data SDATA5, a sub-data SDATA6, a sub-data SDATA7 and a sub-data SDATA8 corresponding to said another write command from the host system, the memory management circuit 502 can write the sub-data SDATA5, the sub-data SDATA6, the sub-data SDATA7 and the sub-data SDATA8 into physical programming units 702(5) to 702(8) of the physical erasing unit 610(A+2), respectively, by using the second mode with the same method of writing the sub-data SDATA1, the sub-data SDATA2, the sub-data SDATA3, the sub-data SDATA4 and the parity information P5 as described above. The memory management circuit 502 further generates parity information P6 according to the sub-data SDATA5, the sub-data SDATA6, the sub-data SDATA7 and the sub-data SDATA8 and writes the parity information P6 into a physical programming unit 702(9) of the physical erasing unit 610(A+2).

Particularly, in view of FIG. 8B and FIG. 9B, it can be known that, more of parity information (i.e., the parity information P1 and P2) related to the first data can be stored when the first data is written by using the first mode, whereas the stored parity information (i.e., the parity information P5) related to the first data is relatively less when the first data is written by using the second mode. With use of the first flag and the second flag, these two data storage modes are able to coexist, and the capability for protecting data may be enhanced when the first mode is used.

Figure 10:
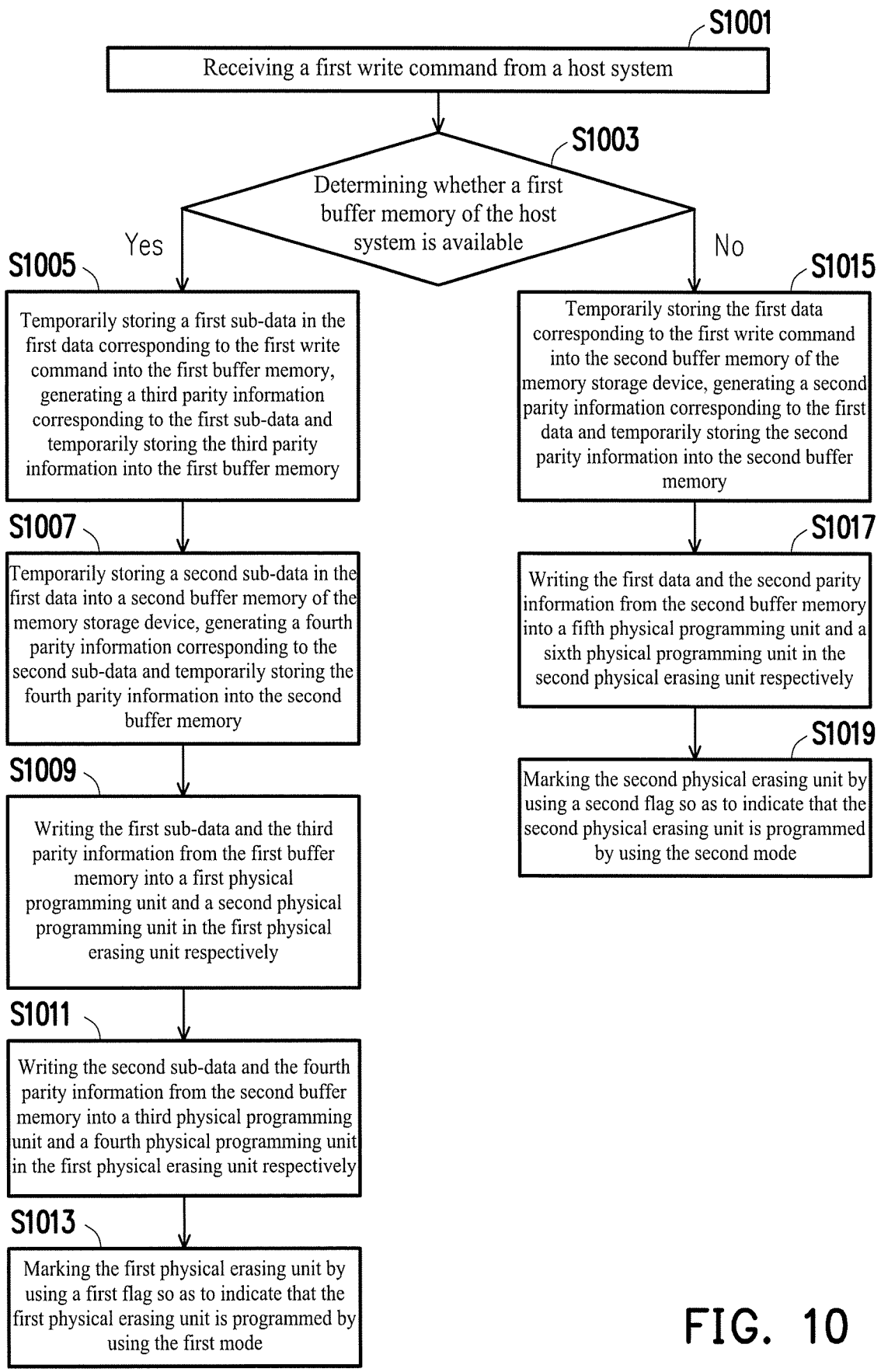
FIG. 10 is a flowchart illustrating a data storing method according to the first exemplary embodiment of the invention.

FIG. 10 is a flowchart illustrating a data storing method according to the first exemplary embodiment of the invention.

With reference to FIG. 10, in step S1001, the memory management circuit 502 receives a first write command from the host system 11. In step S1003, the memory management circuit 502 determines whether a first buffer memory of the host system 11 is available.

When the first buffer memory of the host system 11 is available, in step S1005, the memory management circuit 502 temporarily stores a first sub-data in a first data corresponding to the first write command into the first buffer memory, generates third parity information corresponding to the first sub-data and temporarily stores the third parity information into the first buffer memory. In step S1007, the memory management circuit 502 temporarily stores a second sub-data in the first data into a second buffer memory of the memory storage device 10, generates fourth parity information corresponding to the second sub-data and temporarily stores the fourth parity information into the second buffer memory. In step S1009, the memory management circuit 502 writes the first sub-data and the third parity information from the first buffer memory into a first physical programming unit and a second physical programming unit in the first physical erasing unit respectively. In step S1011, the memory management circuit 502 writes the second sub-data and the fourth parity information from the second buffer memory into a third physical programming unit and a fourth physical programming unit in the first physical erasing unit respectively. In step S1013, the memory management circuit 502 marks the first physical erasing unit by using a first flag so as to indicate that the first physical erasing unit is programmed by using the first mode.

In particular, a writing mode described by step S1005 to step S1013 may be collectively referred to as "the first mode".

On the other hand, when the first buffer memory of the host system 11 is unavailable, in step S1015, the memory management circuit 502 temporarily stores the first data corresponding to the first write command into the second buffer memory of the memory storage device 10, generates second parity information corresponding to the first data and temporarily stores the second parity information into the second buffer memory. In step S1017, the memory management circuit 502 writes the first data and the second parity information from the second buffer memory into a fifth physical programming unit and a sixth physical programming unit in the second physical erasing unit respectively. In step S1019, the memory management circuit 502 marks the second physical erasing unit by using a second flag so as to indicate that the second physical erasing unit is programmed by using the second mode.

In particular, a writing mode described by step S1015 to step S1019 may be collectively referred to as "the second mode".

It should be noted that, in an embodiment of the invention, the first mode and the second mode may also generate parity information for correcting a corresponding data according to different algorithms, respectively. For example, when the space of the buffer memory is sufficient, the parity information may be generated by using an algorithm with a more complicated operation and higher security in the first mode; otherwise, when the space of the buffer memory is insufficient, the parity information may be generated by using an algorithm with a simpler operation and a lower security in the second mode. It should be noted that, the invention is not intended to limit the algorithm used for generating the parity information in the first mode and the algorithm used for generating the parity information in the second mode.

Base on the above, in the first embodiment, the corresponding parity information may be dynamically generated according to a size of an available buffer memory space. When the space of the buffer memory is sufficient, more of the parity information may be written into the physical erasing unit by using the first mode according to the written data, and a mark may be used to indicate that such physical erasing unit is written by using the first mode; when the space of the buffer memory is insufficient, less of the parity information may be written into the physical erasing unit by using the second mode according to the written data, and another mark may be used to indicate that such physical erasing unit is written by using the second mode. Accordingly, the storing method for the parity information may be adjusted according to the available buffer memory space, and the degree of protection for the data stored in the physical erasing unit may also be improved.

Second Exemplary Embodiment

Figure 11A:
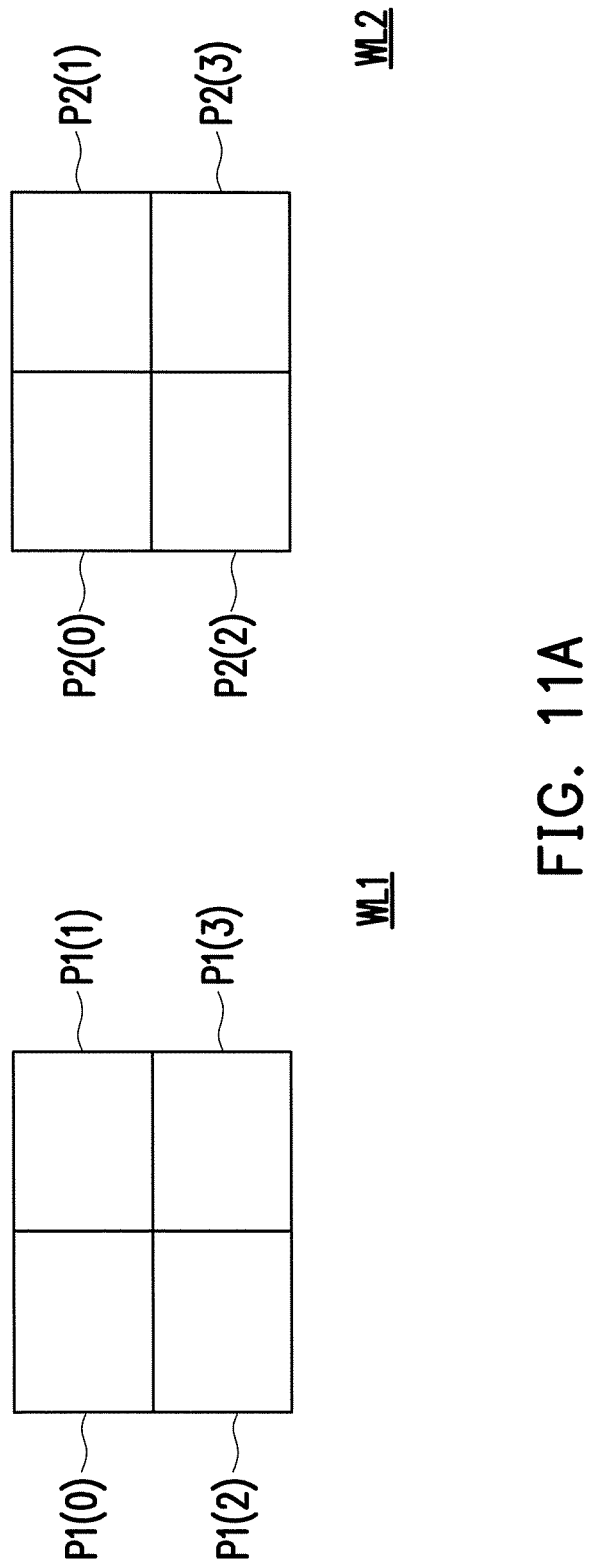
FIG. 11A to FIG. 11C are schematic diagrams illustrating writing operations using the first mode and the second mode according the second exemplary embodiment of the invention.
Figure 11B:
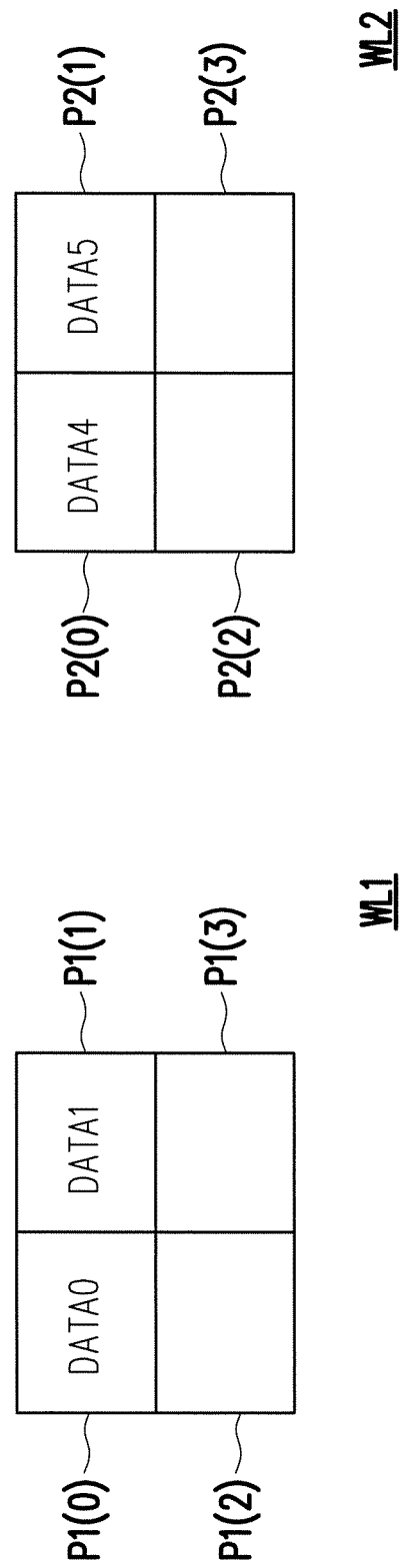
Figure 11C:
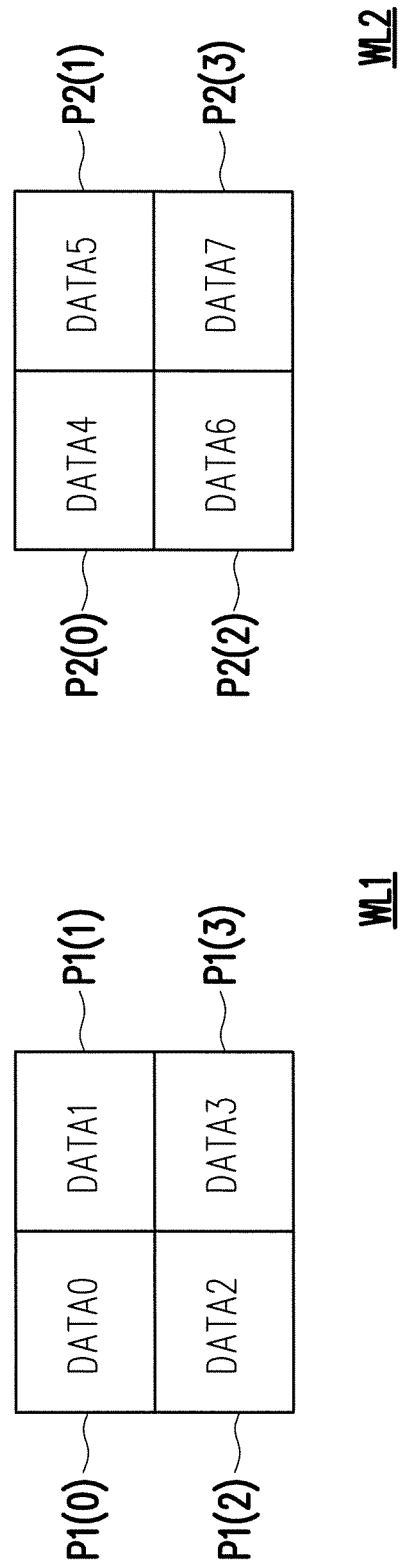

FIG. 11A to FIG. 11C are schematic diagrams illustrating writing operations using the first mode and the second mode according the second exemplary embodiment of the invention.

With reference to FIG. 11A to FIG. 11C, in the present exemplary embodiment, it is assumed that the rewritable non-volatile memory module 406 is a three-dimension NAND flash memory module. The rewritable non-volatile memory module 406 includes a plurality of memory sub-modules and the memory sub-modules include a plurality of word lines. In the present exemplary embodiment, it is assumed that memory cells on each of the word lines in the rewritable non-volatile memory module 406 are able to form four physical programming units. As shown in FIG. 11A, the rewritable non-volatile memory module 406 can include, for example, a word line WL1 (a.k.a. a first word line) belonging to a first memory sub-module among the memory sub-modules and a word line WL2 (a.k.a. a second word line) belonging to a second memory sub-module among the memory sub-modules. Physical programming units P1(0) to P1(3) are formed by the memory cells on the word line WL1, and physical programming units P2(0) to P2(3) are formed by the memory cells on the word line WL2.

It should be noted that, it is assumed herein that the memory management circuit 502 intends to write a first data into the physical programming units on the word line WL1 and the word line WL2. The first data includes a plurality of sub-data. The sub-data are arranged in the following order: a sub-data DATA0, a sub-data DATA1, a sub-data DATA2, a sub-data DATA3, a sub-data DATA4, a sub-data DATA5, a sub-data DATA6 and a sub-data DATA7.

When the memory management circuit 502 receives a first write command for wiring said first data from the host system 11, the memory management circuit 502 can determine an available buffer memory state, and determine whether to write the first data by using a first mode or write the first data by using the second mode according to the available buffer memory state. The buffer memory state has been described in detail above, which is not repeated hereinafter.

When the memory management circuit 502 determines to write the first data by using the first mode, the memory management circuit 502 can directly receive the entire first data from the host system 11, temporarily store the first data into the available buffer memory for the memory management circuit 502 (e.g., into the buffer memory provided by the host system 11 and the buffer memory 510 in the memory storage device 10), and perform a parallel writing for the data in the following manner.

Specifically, when the memory management circuit 502 intends to perform the parallel wiring on the physical programming units on the word line WL1 and the word line WL2, the memory management circuit 502 directly selects data to be stored into the physical programming unit P1(0) and the physical programming unit P1(1) on the word line WL1 and data to be stored into the physical programming unit P2(0) and the physical programming unit P2(1) on the word line WL2 from the entire first data temporarily stored in the buffer memory.

Next, with reference to FIG. 11B, the memory management circuit 502 can select, for example, the sub-data DATA0, the sub-data DATA1, the sub-data DATA4 and the sub-data DATA5 in the first data. Among them, the sub-data DATA0 and the sub-data DATA1 may be collectively referred to as a third sub-data, and the sub-data DATA4 and the sub-data DATA5 may be collectively referred to as a fourth sub-data. In particular, in the first data, the third sub-data and the fourth sub-data are discontinuous. It should be noted that, the sub-data DATA0 is the sub-data to be written into the physical programming unit P1(0) on the word line WL1; the sub-data DATA1 is the sub-data to be written into the physical programming unit P1(1) on the word line WL1; the sub-data DATA4 is the sub-data to be written into the physical programming unit P2(0) on the word line WL2; the sub-data DATA5 is the sub-data to be written into the physical programming unit P2(1) on the word line WL2.

Afterwards, the memory management circuit 502 can sequentially write the sub-data DATA0 and the sub-data DATA1 into the physical programming unit P1(0) and the physical programming unit P1(1) respectively. Similarly, the memory management circuit 502 can sequentially write the sub-data DATA4 and the sub-data DATA5 into the physical programming unit P2(0) and the physical programming unit P2(1) respectively. Among them, the physical programming unit P1(0) and the physical programming unit P1(1) may be collectively referred to as a seventh physical programming unit, and the physical programming unit P2(0) and the physical programming unit P2(1) may be collectively referred to as an eighth physical programming unit.

Afterwards, the memory management circuit 502 selects data to be stored into the physical programming unit P1(2) and the physical programming unit P1(3) on the word line WL1 and data to be stored into the physical programming unit P2(2) and the physical programming unit P2(3) on the word line WL2 from the entire first data temporarily stored in the buffer memory.

Next, with reference to FIG. 11C, the memory management circuit 502 can, for example, select the sub-data DATA2, the sub-data DATA3, the sub-data DATA6 and the sub-data DATA7 in the first data. It should be noted that, the sub-data DATA2 is the sub-data to be written into the physical programming unit P1(2) on the word line WL1, and the sub-data DATA3 is the sub-data to be written into the physical programming unit P1(3) on the word line WL1. The sub-data DATA6 is the sub-data to be written into the physical programming unit P2(2) on the word line WL2, and the sub-data DATA7 is the sub-data to be written into the physical programming unit P2(3) on the word line WL2.

Afterwards, the memory management circuit 502 can sequentially write the sub-data DATA2 and the sub-data DATA3 into the physical programming unit P1(2) and the physical programming unit P1(3) respectively. Similarly, the memory management circuit 502 can sequentially write the sub-data DATA6 and the sub-data DATA7 into the physical programming unit P2(2) and the physical programming unit P2(3) respectively. In this way, the writing operation using the first mode may be completed.

However, when it is intended to write the data by using the second mode (e.g., when the available buffer memory is insufficient or the host system 11 does not provide the buffer memory space for the memory management circuit 502 to use), the memory management circuit 502 then asks for the data required in the parallel writing by transmitting a data request command instead.

Specifically, when the memory management circuit 502 determines to write the first data by using the second mode, the memory management circuit 502 can transmit a first data request command to the host system 11 to request for the sub-data DATA0 and the sub-data DATA1 to be stored into the physical programming unit P1(0) and the physical programming unit P1(1) on the word line WL1. The first data request command also asks the host system 11 for the sub-data DATA4 and the sub-data DATA5 to be stored into the physical programming unit P2(0) and the physical programming unit P2(1) on the word line WL2. In this way, the memory management circuit 502 does not have to temporarily store the entire first data.

After obtaining the sub-data DATA0, the sub-data DATA1, the sub-data DATA4 and the sub-data DATA5 from the host system 11, according to a method similar to that of FIG. 11B, the memory management circuit 502 can sequentially write the sub-data DATA0 and the sub-data DATA1 into the physical programming unit P1(0) and the physical programming unit P1(1) respectively, and sequentially write the sub-data DATA4 and the sub-data DATA5 into the physical programming unit P2(0) and the physical programming unit P2(1) respectively.

Afterwards, the memory management circuit 502 can transmit another data request command to the host system 11 to request for the sub-data DATA2 and the sub-data DATA3 to be stored into the physical programming unit P1(2) and the physical programming unit P1(3) on the word line WL1. The another data request command also asks the host system 11 for the sub-data DATA6 and the sub-data DATA7 to be stored into the physical programming unit P2(2) and the physical programming unit P2(3) on the second line WL2.

After obtaining the sub-data DATA2, the sub-data DATA3, the sub-data DATA6 and the sub-data DATA7 from the host system 11, according to a method similar to that of FIG. 11C, the memory management circuit 502 can sequentially write the sub-data DATA2 and the sub-data DATA3 into the physical programming unit P1(2) and the physical programming unit P1(3) respectively, and sequentially write the sub-data DATA6 and the sub-data DATA7 into the physical programming unit P2(2) and the physical programming unit P2(3) respectively.

In other words, in the second exemplary embodiment, when the buffer memory is insufficient, the data request command in the second mode may be used to ask the host system 11 for the required data for the parallel writing without temporarily storing the entire first data like the first mode does.

In particular, after going through the writing operation as described above, the data stored in the physical programming units P1(2) to P1(3) at the end of the word line WL1 is arranged subsequent to the data stored in the physical programming units P2(0) to P2(1) at the beginning of the word line WL2. In other words, after going through the writing operation as described above, the data will be sequentially stored in the word line WL1 and the word line WL2.

However, it should be noted that, the invention is not intended to limit the number of the physical programming units on one word line. In other embodiments, one word line may include more or less physical programming units.

Figure 12:
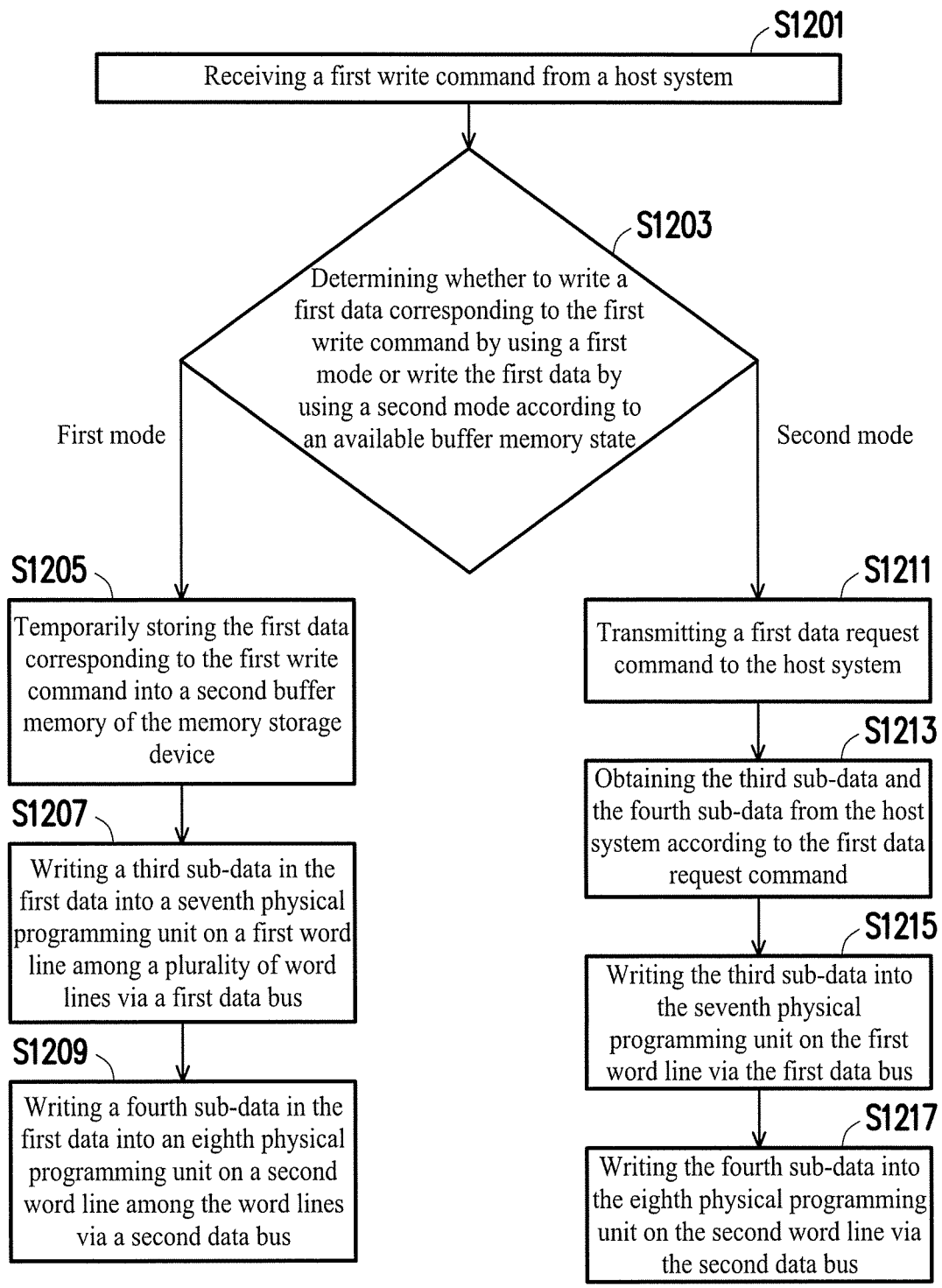
FIG. 12 is a flowchart illustrating a data storing method according to the second exemplary embodiment of the invention.

FIG. 12 is a flowchart illustrating a data storing method according to the second exemplary embodiment of the invention.

With reference to FIG. 12, in step S1201, the memory management circuit 502 receives a first write command from the host system 11. In step S1203, the memory management circuit 502 determines whether to write a first data corresponding to the first write command by using a first mode or write the first data by using a second mode according to an available buffer memory state.

When the memory management circuit 502 determines to write the first data corresponding to the first write command by using the first mode, in step S1205, the memory management circuit 502 temporarily stores the first data corresponding to the first write command into the buffer memory 510 of the memory storage device 10. Afterwards, in step S1207, the memory management circuit 502 writes a third sub-data in the first data into a seventh physical programming unit on a first word line via a first data bus. Here, the first word line belongs to a first memory sub-module among aforesaid memory sub-modules. Lastly, in step S1209, the memory management circuit 502 writes a fourth sub-data in the first data into an eighth physical programming unit on a second word line via a second data bus. Here, the second word line belongs to a second memory sub-module among the memory sub-modules.

Nonetheless, when the memory management circuit 502 determines to write the first data corresponding to the first write command by using the second mode, in step S1211, the memory management circuit 502 transmits a first data request command to the host system 11. In step S1213, the memory management circuit 502 obtains the third sub-data and the fourth sub-data from the host system 11 according to the first data request command. In step S1215, the memory management circuit 502 writes the third sub-data into the seventh physical programming unit on the first word line via the first data bus. In step S1217, the memory management circuit 502 writes the fourth sub-data into the eighth physical programming unit on the second word line via the second data bus.

It should be noted that, in the first data, the third sub-data and the fourth sub-data are discontinuous.

Based on the above, in the second exemplary embodiment, whether to temporarily store all the data to be written or to ask the host system 11 for partial data among the data to be written by using the command instead may be dynamically determined according to the size of the available buffer memory space, such that the effectiveness of the parallel writing may be achieved.

Third Exemplary Embodiment

In the third exemplary embodiment, the memory management circuit 502 can determine whether to write a first data corresponding to a first write command into one single word line or discretely write the first data into multiple word lines. In particular, due to the physical properties of the rewritable nonvolatile memory itself, if a specific data is completely stored in one single word line, a probability of failure occurred in a decoding process may be higher while accessing that specific data. Therefore, whether to write the data into one single word line or discretely write the data into multiple word lines may be determined by taking an available buffer memory state into consideration.

In the third exemplary embodiment, when the memory management circuit 502 receives the first write command for wiring the first data from the host system 11, the memory management circuit 502 can determine the available buffer memory state, and determine whether to write the first data by using a first mode or write the first data by using a second mode. The buffer memory state has been described in detail above, which is not repeated hereinafter. In addition, it is assumed herein that the first data includes a fifth sub-data and a sixth sub-data in the third exemplary embodiment.

When the memory management circuit 502 determines to write the first data by using the first mode, the memory management circuit 502 temporarily stores the first data into the buffer memory 510 of the memory storage device. Afterwards, the memory management circuit 502 writes the fifth sub-data in the first data from the buffer memory 510 into a physical programming unit (a.k.a. a ninth physical programming unit) on a word line (a.k.a. a third word line) among a plurality of word lines. Then, the memory management circuit 502 writes the sixth sub-data in the first data from the buffer memory 510 into a physical programming unit (a.k.a. a tenth physical programming unit) on a word line (a.k.a. a fourth word line) among the word lines. Lastly, the memory management circuit 502 generates parity information (a.k.a. fifth parity information) for error checking or correcting according to the fifth sub-data and the sixth sub-data, and stores the fifth parity information into a physical programming unit (a.k.a. an eleventh physical programming unit).

When the memory management circuit 502 determines to write the first data by using the second mode, according to an order for transmitting the fifth sub-data and the sixth sub-data by the host system 11, the memory management circuit 502 sequentially writes the fifth sub-data and the sixth sub-data into a physical programming unit (a.k.a. a twelfth physical programming unit) and another physical programming unit (a.k.a. a thirteenth physical programming unit) on a word line (a.k.a. a fifth word line) among the word lines respectively. Afterwards, the memory management circuit 502 generates parity information (a.k.a. sixth parity information) for error checking or correcting according to the fifth sub-data and the sixth sub-data, and stores the sixth parity information into a physical programming unit (a.k.a. a fourteenth physical programming unit). In other words, in the present exemplary embodiment, when the available buffer memory space is sufficient, the data of the write command is discretely written into the different word lines by using the first mode. When the available buffer memory space is sufficient, the data of the write command is written into the same word line by using the second mode. If the data of the write command is discretely written into the different word lines, a probability of success in decoding may be improved while accessing the data.

Figure 13:
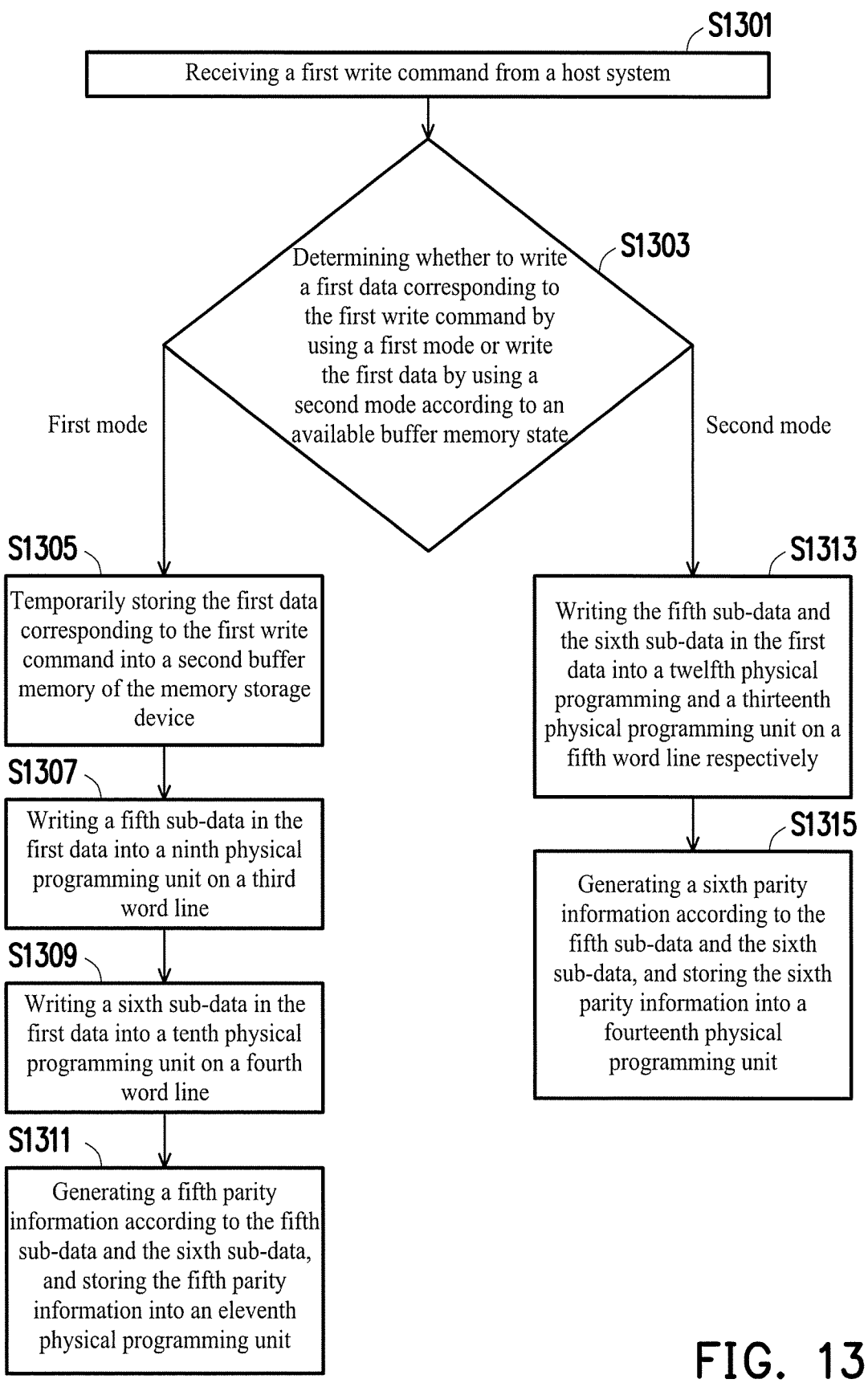
FIG. 13 is a flowchart illustrating a data storing method according to the third exemplary embodiment of the invention.

FIG. 13 is a flowchart illustrating a data storing method according to the third exemplary embodiment of the invention.

With reference to FIG. 13, in step S1301, the memory management circuit 502 receives a first write command from the host system 11. In step S1303, the memory management circuit 502 determines whether to write a first data corresponding to the first write command by using a first mode or write the first data by using a second mode according to an available buffer memory state.

When the memory management circuit 502 determines to write the first data corresponding to the first write command by using the first mode, in step S1305, the memory management circuit 502 temporarily stores the first data corresponding to the first write command into the buffer memory 510 of the memory storage device 10. In step S1307, the memory management circuit 502 writes a fifth sub-data in the first data into a ninth physical programming unit on a third word line. In step S1309, the memory management circuit 502 writes a sixth sub-data in the first data into a tenth physical programming unit on a fourth word line. Lastly, in step S1311, the memory management circuit 502 generates fifth parity information according to the fifth sub-data and the sixth sub-data, and stores the fifth parity information into an eleventh physical programming unit.

When the memory management circuit 502 determines to write the first data corresponding to the first write command by using the second mode, in step S1313, the memory management circuit 502 writes the first sub-data and the sixth sub-data in the first data into a thirteenth physical programming unit on a fifth word line respectively. Lastly, in step S1315, the memory management circuit 502 generates sixth parity information according to the fifth sub-data and the sixth sub-data, and stores the sixth parity information into a fourteenth physical programming unit.

Based on the above, in the third exemplary embodiment, whether to write the data into the same word line or discretely write the data into the different word lines may be dynamically determined according to the size of the available buffer memory space. Once the data of the write command is discretely written into the different word lines, the probability of success in decoding may be improved while accessing the data.

In summary, the data storing method, the memory control circuit unit and the memory storage device proposed by the invention are capable of dynamically determining how the data is written according to the available buffer memory state. As a result, flexibility in use of the memory storage device may be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data storing method for a memory storage device having a rewritable non-volatile memory module, the rewritable non-volatile memory module comprising a plurality of physical erasing units, each physical erasing unit among the physical erasing units comprising a plurality of physical programming units, the data storing method comprising:
   receiving a first write command from a host system;
   determining whether to write a first data corresponding to the first write command by using a first mode or write the first data by using a second mode according to an available buffer memory state;
   writing the first data into a first physical erasing unit among the physical erasing units by using the first mode when the first data is determined to be written by using the first mode according to the available buffer memory state; and
   writing the first data into a second physical erasing unit among the physical erasing units by using the second mode when the first data is determined to be written by using the second mode according to the available buffer memory state,
   wherein first parity information for correcting the first data comprises a third parity information and a fourth parity information, wherein the step of writing the first data into the first physical erasing unit among the physical erasing units by using the first mode comprises:
   temporarily storing a first sub-data in the first data into a first buffer memory of the host system, generating the third parity information corresponding to the first sub-data and temporarily storing the third parity information into the first buffer memory, wherein the first buffer memory is located in a random access memory of the host system and configured for being accessed by the memory storage device;
   temporarily storing a second sub-data in the first data into a second buffer memory of the memory storage device, generating the fourth parity information corresponding to the second sub-data and temporarily storing the fourth parity information into the second buffer memory;
   writing the first sub-data and the third parity information from the first buffer memory into a first physical programming unit and a second physical programming unit in the first physical erasing unit respectively;
   writing the second sub-data and the fourth parity information from the second buffer memory into a third physical programming unit and a fourth physical programming unit in the first physical erasing unit respectively; and
   marking the first physical erasing unit by using a first flag so as to indicate that the first physical erasing unit is programmed by using the first mode.

2. The data storing method according to claim 1, wherein the step of writing the first data into the first physical erasing unit among the physical erasing units by using the first mode comprises:
   writing the first data and the first parity information for correcting the first data into the first physical erasing unit among the physical erasing units,
   wherein the step of writing the first data into the second physical erasing unit among the physical erasing units by using the second mode comprises:
   writing the first data and second parity information for correcting the first data into the second physical erasing unit among the physical erasing units,
   wherein an amount of the first parity information is greater than an amount of the second parity information.

3. The data storing method according to claim 2, wherein the step of determining whether to write the first data by using the first mode or write the first data by using the second mode according to the available buffer memory state comprises:
   determining whether the first buffer memory of the host system is available;
   writing the first data by using the first mode when the first buffer memory of the host system is available; and
   writing the first data by using the second mode when the first buffer memory of the host system is unavailable.

4. The data storing method according to claim 2, wherein after the step of writing the first data and the first parity information corresponding to the first data into the first physical erasing unit among the physical erasing units, the first physical erasing unit is restricted only to be programmed by using the first mode.

5. The data storing method according to claim 2, wherein after the step of writing the first data and the second parity information corresponding to the first data into the second physical erasing unit among the physical erasing units, the second physical erasing unit is restricted only to be programmed by using the second mode.

6. The data storing method according to claim 1, wherein the step of writing the first data and the second parity information corresponding to the first data into the second physical erasing unit among the physical erasing units comprises:
   temporarily storing the first data into the second buffer memory of the memory storage device, generating the second parity information corresponding to the first data and temporarily storing the second parity information into the second buffer memory;
   writing the first data and the second parity information from the second buffer memory into a fifth physical programming unit and a sixth physical programming unit in the second physical erasing unit respectively; and
   marking the second physical erasing unit by using a second flag so as to indicate that the second physical erasing unit is programmed by using the second mode.

7. The data storing method according to claim 1, wherein the first mode and the second mode generate parity information for correcting a corresponding data according to different algorithms, respectively.

8. The data storing method according to claim 1, wherein the rewritable non-volatile memory module comprises a plurality of memory sub-modules individually coupled to a memory control circuit unit, and the memory sub-modules comprise a plurality of word lines, the step of writing the first data into the first physical erasing unit among the physical erasing units by using the first mode comprises:

temporarily storing the first data corresponding to the first write command into a second buffer memory of the memory storage device;

writing a third sub-data in the first data into a seventh physical programming unit on a first word line among the word lines via a first data bus, wherein the first word line belongs to a first memory sub-module among the memory sub-modules; and writing a fourth sub-data in the first data into an eighth physical programming unit on a second word line among the word lines via a second data bus, wherein the second word line belongs to a second memory sub-module among the memory sub-modules, wherein the step of writing the first data into the second physical erasing unit among the physical erasing units by using the second mode comprises:

transmitting at least one first data request command to the host system;

obtaining the third sub-data and the fourth sub-data from the host system according to the first data request command;

writing the third sub-data into the seventh physical programming unit on the first word line among the word lines via the first data bus; and writing the fourth sub-data into the eighth physical programming unit on the second word line among the word lines via the second data bus, wherein the third sub-data and the fourth sub-data are discontinuous in the first data.

9. A data storing method for a memory storage device having a rewritable non-volatile memory module, the rewritable non-volatile memory module comprising a plurality of physical erasing units, each physical erasing unit among the physical erasing units comprising a plurality of physical programming units, the data storing method comprising:

receiving a first write command from a host system;

determining whether to write a first data corresponding to the first write command by using a first mode or write the first data by using a second mode according to an available buffer memory state;

writing the first data into a first physical erasing unit among the physical erasing units by using the first mode when the first data is determined to be written by using the first mode according to the available buffer memory state; and writing the first data into a second physical erasing unit among the physical erasing units by using the second mode when the first data is determined to be written by using the second mode according to the available buffer memory state, wherein the rewritable non-volatile memory module comprises a plurality of word lines, the step of writing the first data into the first physical erasing unit among the physical erasing units by using the first mode comprises:

temporarily storing the first data corresponding to the first write command into a second buffer memory of the memory storage device;

writing a fifth sub-data in the first data into a ninth physical programming unit on a third word line among the word lines;

writing a sixth sub-data in the first data into a tenth physical programming unit on a fourth word line among the word lines; and generating fifth parity information according to the fifth sub-data and the sixth sub-data, and storing the fifth parity information into an eleventh physical programming unit, wherein the step of writing the first data into the second physical erasing unit among the physical erasing units by using the second mode comprises:

writing the fifth sub-data and the sixth sub-data in the first data into a twelfth physical programming unit and a thirteenth physical programming unit on a fifth word line among the word lines respectively; and generating sixth parity information according to the fifth sub-data and the sixth sub-data, and storing the sixth parity information into a fourteenth physical programming unit.

10. A memory control circuit unit for controlling a rewritable non-volatile memory module, wherein the rewritable non-volatile memory module comprises a plurality of physical erasing units, and each physical erasing unit among the physical erasing units comprises a plurality of physical programming units, wherein the memory control circuit unit comprises:

a host interface, configured to couple to a host system;

a memory interface, configured to couple to a rewritable non-volatile memory module;

a memory management circuit, coupled to the host interface and the memory interface, wherein the memory management circuit is configured to receive a first write command from the host system, the memory management circuit is further configured to determine whether to write a first data corresponding to the first write command by using a first mode or write the first data by using a second mode according to an available buffer memory state, the memory management circuit is further configured to write the first data into a first physical erasing unit among the physical erasing units by using the first mode when the first data is determined to be written by using the first mode according to the available buffer memory state, and the memory management circuit is further configured to write the first data into a second physical erasing unit among the physical erasing units by using the second mode when the first data is determined to be written by using the second mode according to the available buffer memory state, wherein first parity information for correcting the first data comprises a third parity information and a fourth parity information, wherein in the operation of writing the first data into the first physical erasing unit among the physical erasing units, the memory management circuit is further configured to temporarily store a first sub-data in the first data into a first buffer memory of the host system, generate the third parity information corresponding to the first sub-data and temporarily store the third parity information into the first buffer memory, wherein the first buffer memory is located in a random access memory of the host system and configured for being accessed by a memory storage device, the memory management circuit is further configured to temporarily store a second sub-data in the first data into a second buffer memory of the memory storage device, generate the fourth parity information corresponding to the second sub-data and temporarily store the fourth parity information into the second buffer memory, the memory management circuit is further configured to write the first sub-data and the third parity information from the first buffer memory into a first physical programming unit and a second physical programming unit in the first physical erasing unit respectively, the memory management circuit is further configured to write the second sub-data and the fourth parity information from the second buffer memory into a third physical programming unit and a fourth physical programming unit in the first physical erasing unit respectively, and the memory management circuit is further configured to mark the first physical erasing unit by using a first flag so as to indicate that the first physical erasing unit is programmed by using the first mode.

11. The memory control circuit unit according to claim 10, wherein in the operation of writing the first data into the first physical erasing unit among the physical erasing units by using the first mode, the memory management circuit writes the first data and the first parity information for correcting the first data into the first physical erasing unit among the physical erasing units, wherein in the operation of writing the first data into the second physical erasing unit among the physical erasing units by using the second mode, the memory management circuit writes the first data and second parity information for correcting the first data into the second physical erasing unit among the physical erasing units, wherein an amount of the first parity information is greater than an amount of the second parity information.

12. The memory control circuit unit according to claim 11, wherein in the operation of determining whether to write the first data by using the first mode or write the first data by using the second mode according to the available buffer memory state, the memory management circuit is further configured to determine whether the first buffer memory of the host system is available, the memory management circuit writes the first data by using the first mode when the first buffer memory of the host system is available, and the memory management circuit writes the first data by using the second mode when the first buffer memory of the host system is unavailable.

13. The memory control circuit unit according to claim 11, wherein after the operation of writing the first data and the first parity information corresponding to the first data into the first physical erasing unit among the physical erasing units, the first physical erasing unit is restricted only to be programmed by using the first mode.

14. The memory control circuit unit according to claim 11, wherein after the operation of writing the first data and the second parity information corresponding to the first data into the second physical erasing unit among the physical erasing units, the second physical erasing unit is restricted only to be programmed by using the second mode.

15. The memory control circuit unit according to claim 10, wherein in the operation of writing the first data and the second parity information corresponding to the first data into the second physical erasing unit among the physical erasing units, the memory management circuit is further configured to temporarily store the first data into the second buffer memory of the memory storage device, generate the second parity information corresponding to the first data and temporarily store the second parity information into the second buffer memory, the memory management circuit is further configured to write the first data and the second parity information from the second buffer memory into a fifth physical programming unit and a sixth physical programming unit in the second physical erasing unit respectively, and the memory management circuit is further configured to mark the second physical erasing unit by using a second flag so as to indicate that the second physical erasing unit is programmed by using the second mode.

16. The memory control circuit unit according to claim 10, wherein the first mode and the second mode generate parity information for correcting a corresponding data according to different algorithms, respectively.

17. The memory control circuit unit according to claim 10, wherein the rewritable non-volatile memory module comprises a plurality of memory sub-modules individually coupled to the memory control circuit unit, and the memory sub-modules comprise a plurality of word lines, wherein in the operation of writing the first data into the first physical erasing unit among the physical erasing units by using the first mode, the memory management circuit temporarily stores the first data corresponding to the first write command into a second buffer memory of a memory storage device, the memory management circuit writes a third sub-data in the first data into a seventh physical programming unit on a first word line among the word lines via a first data bus, wherein the first word line belongs to a first memory sub-module among the memory sub-modules, and the memory management circuit writes a fourth sub-data in the first data into an eighth physical programming unit on a second word line among the word lines via a second data bus, wherein the second word line belongs to a second memory sub-module among the memory sub-modules, wherein in the operation of writing the first data into the second physical erasing unit among the physical erasing units by using the second mode, the memory management circuit transmits at least one first data request command to the host system, the memory management circuit obtains the third sub-data and the fourth sub-data from the host system according to the first data request command, the memory management circuit writes the third sub-data into the seventh physical programming unit on the first word line among the word lines via the first data bus, and the memory management circuit writes the fourth sub-data into the eighth physical programming unit on the second word line among the word lines via the second data bus, wherein the third sub-data and the fourth sub-data are discontinuous in the first data.

18. A memory control circuit unit for controlling a rewritable non-volatile memory module, wherein the rewritable non-volatile memory module comprises a plurality of physical erasing units, and each physical erasing unit among the physical erasing units comprises a plurality of physical programming units, wherein the memory control circuit unit comprises:

a host interface, configured to couple to a host system;

a memory interface, configured to couple to a rewritable non-volatile memory module;

a memory management circuit, coupled to the host interface and the memory interface, wherein the memory management circuit is configured to receive a first write command from the host system, the memory management circuit is further configured to determine whether to write a first data corresponding to the first write command by using a first mode or write the first data by using a second mode according to an available buffer memory state, the memory management circuit is further configured to write the first data into a first physical erasing unit among the physical erasing units by using the first mode when the first data is determined to be written by using the first mode according to the available buffer memory state, and the memory management circuit is further configured to write the first data into a second physical erasing unit among the physical erasing units by using the second mode when the first data is determined to be written by using the second mode according to the available buffer memory state, wherein the rewritable non-volatile memory module comprises a plurality of word lines, wherein in the operation of writing the first data into the first physical erasing unit among the physical erasing units by using the first mode, the memory management circuit temporarily stores the first data corresponding to the first write command into a second buffer memory of a memory storage device, the memory management circuit writes a fifth sub-data in the first data into a ninth physical programming unit on a third word line among the word lines, the memory management circuit writes a sixth sub-data in the first data into a tenth physical programming unit on a fourth word line among the word lines, and the memory management circuit generates fifth parity information according to the fifth sub-data and the sixth sub-data, and stores the fifth parity information into an eleventh physical programming unit, wherein in the operation of writing the first data into the second physical erasing unit among the physical erasing units by using the second mode, the memory management circuit writes the fifth sub-data and the sixth sub-data in the first data into a twelfth physical programming unit and a thirteenth physical programming unit on a fifth word line among the word lines respectively, and the memory management circuit generates sixth parity information according to the fifth sub-data and the sixth sub-data, and stores the sixth parity information into a fourteenth physical programming unit.

19. A memory storage device, comprising:

a connection interface unit, configured to couple to a host system;

a rewritable non-volatile memory module, comprising a plurality of physical erasing units, and each physical erasing unit among the physical erasing units comprising a plurality of physical programming units; and a memory control circuit unit, coupled to the connection interface unit and the rewritable non-volatile memory module, wherein the memory control circuit unit is configured to receive a first write command from the host system, wherein the memory control circuit unit is further configured to determine whether to write a first data corresponding to the first write command by using a first mode or write the first data by using a second mode according to an available buffer memory state, the memory control circuit unit is further configured to write the first data into a first physical erasing unit among the physical erasing units by using the first mode when the first data is determined to be written by using the first mode according to the available buffer memory state, and the memory control circuit unit is further configured to write the first data into a second physical erasing unit among the physical erasing units by using the second mode when the first data is determined to be written by using the second mode according to the available buffer memory state, wherein first parity information for correcting the first data comprises a third parity information and a fourth parity information, wherein in the operation of writing the first data into the first physical erasing unit among the physical erasing units, the memory control circuit unit is further configured to temporarily store a first sub-data in the first data into a first buffer memory of the host system, generate the third parity information corresponding to the first sub-data and temporarily store the third parity information into the first buffer memory, wherein the first buffer memory is located in a random access memory of the host system and configured for being accessed by the memory storage device, the memory control circuit unit is further configured to temporarily store a second sub-data in the first data into a second buffer memory of the memory storage device, generate the fourth parity information corresponding to the second sub-data and temporarily store the fourth parity information into the second buffer memory, the memory control circuit unit is further configured to write the first sub-data and the third parity information from the first buffer memory into a first physical programming unit and a second physical programming unit in the first physical erasing unit respectively, the memory control circuit unit is further configured to write the second sub-data and the fourth parity information from the second buffer memory into a third physical programming unit and a fourth physical programming unit in the first physical erasing unit respectively, and the memory control circuit unit is further configured to mark the first physical erasing unit by using a first flag so as to indicate that the first physical erasing unit is programmed by using the first mode.

20. The memory storage device according to claim 19, wherein in the operation of writing the first data into the first physical erasing unit among the physical erasing units by using the first mode, the memory control circuit unit writes the first data and the first parity information for correcting the first data into the first physical erasing unit among the physical erasing units, wherein in the operation of writing the first data into the second physical erasing unit among the physical erasing units by using the second mode, the memory control circuit unit writes the first data and second parity information for correcting the first data into the second physical erasing unit among the physical erasing units, wherein an amount of the first parity information is greater than an amount of the second parity information.

21. The memory storage device according to claim 20, wherein in the operation of determining whether to write the first data by using the first mode or write the first data by using the second mode according to the available buffer memory state,
the memory control circuit unit is further configured to determine whether the first buffer memory of the host system is available,
the memory control circuit unit writes the first data by using the first mode when the first buffer memory of the host system is available, and
the memory control circuit unit is further configured to write the first data by using the second mode when the first buffer memory of the host system is unavailable.

22. The memory storage device according to claim 20, wherein after the operation of writing the first data and the first parity information corresponding to the first data into the first physical erasing unit among the physical erasing units, the first physical erasing unit is restricted only to be programmed by using the first mode.

23. The memory storage device according to claim 20, wherein after the operation of writing the first data and the second parity information corresponding to the first data into the second physical erasing unit among the physical erasing units, the second physical erasing unit is restricted only to be programmed by using the second mode.

24. The memory storage device according to claim 19, wherein in the operation of writing the first data and the second parity information corresponding to the first data into the second physical erasing unit among the physical erasing units,
the memory control circuit unit is further configured to temporarily store the first data into the second buffer memory of the memory storage device, generate the second parity information corresponding to the first data and temporarily store the second parity information into the second buffer memory,
the memory control circuit unit is further configured to write the first data and the second parity information from the second buffer memory into a fifth physical programming unit and a sixth physical programming unit in the second physical erasing unit respectively, and
the memory control circuit unit is further configured to mark the second physical erasing unit by using a second flag so as to indicate that the second physical erasing unit is programmed by using the second mode.

25. The memory storage device according to claim 19, wherein the first mode and the second mode generate parity information for correcting a corresponding data according to different algorithms, respectively.

26. The memory storage device according to claim 19,
wherein the rewritable non-volatile memory module comprises a plurality of memory sub-modules individually coupled to the memory control circuit unit, and the memory sub-modules comprise a plurality of word lines, wherein in the operation of writing the first data into the first physical erasing unit among the physical erasing units by using the first mode,
the memory control circuit unit temporarily stores the first data corresponding to the first write command into a second buffer memory of the memory storage device,
the memory control circuit unit writes a third sub-data in the first data into a seventh physical programming unit on a first word line among the word lines via a first data bus, wherein the first word line belongs to a first memory sub-module among the memory sub-modules, and
the memory management circuit writes a fourth sub-data in the first data into an eighth physical programming unit on a second word line among the word lines via a second data bus, wherein the second word line belongs to a second memory sub-module among the memory sub-modules,
wherein in the operation of writing the first data into the second physical erasing unit among the physical erasing units by using the second mode,
the memory control circuit unit transmits at least one first data request command to the host system,
the memory control circuit unit obtains the third sub-data and the fourth sub-data from the host system according to the first data request command,
the memory control circuit unit writes the third sub-data into the seventh physical programming unit on the first word line among the word lines via the first data bus, and
the memory control circuit unit writes the fourth sub-data into the eighth physical programming unit on the second word line among the word lines via the second data bus,
wherein the third sub-data and the fourth sub-data are discontinuous in the first data.

27. A memory storage device, comprising:
a connection interface unit, configured to couple to a host system;
a rewritable non-volatile memory module, comprising a plurality of physical erasing units, and each physical erasing unit among the physical erasing units comprising a plurality of physical programming units; and
a memory control circuit unit, coupled to the connection interface unit and the rewritable non-volatile memory module,
wherein the memory control circuit unit is configured to receive a first write command from the host system,
wherein the memory control circuit unit is further configured to determine whether to write a first data corresponding to the first write command by using a first mode or write the first data by using a second mode according to an available buffer memory state,
the memory control circuit unit is further configured to write the first data into a first physical erasing unit among the physical erasing units by using the first mode when the first data is determined to be written by using the first mode according to the available buffer memory state, and
the memory control circuit unit is further configured to write the first data into a second physical erasing unit among the physical erasing units by using the second mode when the first data is determined to be written by using the second mode according to the available buffer memory state, wherein the rewritable non-volatile memory module comprises a plurality of word lines,
wherein in the operation of writing the first data into the first physical erasing unit among the physical erasing units by using the first mode,
the memory control circuit unit temporarily stores the first data corresponding to the first write command into a second buffer memory of the memory storage device,
the memory control circuit unit writes a fifth sub-data in the first data into a ninth physical programming unit on a third word line among the word lines, the memory control circuit unit writes a sixth sub-data in the first data into a tenth physical programming unit on a fourth word line among the word lines, and the memory control circuit unit generates fifth parity information according to the fifth sub-data and the sixth sub-data, and stores the fifth parity information into an eleventh physical programming unit, wherein in the operation of writing the first data into the second physical erasing unit among the physical erasing units by using the second mode, the memory control circuit unit writes the fifth sub-data and the sixth sub-data in the first data into a twelfth physical programming unit and a thirteenth physical programming unit on a fifth word line among the word lines respectively, and the memory control circuit unit generates sixth parity information according to the fifth sub-data and the sixth sub-data, and stores the sixth parity information into a fourteenth physical programming unit.

* * * * *